United States Patent [19]
Bothe

[11] Patent Number: 5,823,468
[45] Date of Patent: Oct. 20, 1998

[54] HYBRID AIRCRAFT

[76] Inventor: Hans-Jurgen Bothe, 61 Scothaven, 52246 Range Road 232, Sherwood Park, Alberta, Canada

[21] Appl. No.: 547,574

[22] Filed: Oct. 24, 1995

[51] Int. Cl.$^6$ ........................................................ B64B 1/34
[52] U.S. Cl. ................... 244/2; 244/7 C; 244/12.3; 244/25; 244/26; 244/125; 244/66; 244/48; 244/23 B; 244/209
[58] Field of Search .................................. 244/2, 24, 25, 244/26, 29, 6, 7 R, 7 C, 48, 56, 66, 30, 117 R, 119, 125, 207, 208, 209, 12.3, 12.4, 12.5, 23 R, 23 A, 23 B, 23 D, 52

[56] References Cited

U.S. PATENT DOCUMENTS

| | | | |
|---|---|---|---|
| 1,686,130 | 10/1928 | Hall | 244/25 |
| 1,726,062 | 8/1929 | Gilman | 244/25 |
| 1,766,844 | 6/1930 | Springer | 244/12.3 |
| 2,052,025 | 10/1936 | Clark . | |
| 2,060,469 | 11/1936 | Noble | 244/26 |
| 2,082,376 | 6/1937 | Boettner . | |
| 2,091,580 | 8/1937 | Belinski . | |
| 2,462,201 | 2/1949 | Kilgore . | |
| 3,110,456 | 11/1963 | Creasey . | |
| 3,545,210 | 12/1970 | Cresswell | 244/12.3 |
| 3,614,033 | 10/1971 | McCarty | 244/48 |
| 3,877,665 | 4/1975 | Riccius . | |
| 3,934,843 | 1/1976 | Black | 244/48 |
| 3,970,270 | 7/1976 | Pittet, Jr. | 244/30 |
| 4,052,025 | 10/1977 | Clark et al. | 244/25 |
| 4,149,688 | 4/1979 | Miller | 244/12.4 |
| 4,591,112 | 5/1986 | Piasecki et al. | 244/26 |
| 4,605,185 | 8/1986 | Reyes | 244/60 |
| 4,889,297 | 12/1989 | Ikeda | 244/5 |
| 5,069,290 | 12/1991 | Brotz | 169/45 |
| 5,110,070 | 5/1992 | Hagenlocher et al. | 244/125 |
| 5,178,344 | 1/1993 | Dlouhy | 244/12.4 |
| 5,285,986 | 2/1994 | Hagenlocher | 244/97 |
| 5,383,627 | 1/1995 | Bundo | 244/26 |

FOREIGN PATENT DOCUMENTS

| | | | |
|---|---|---|---|
| 262425 | 5/1963 | Australia | 244/12.3 |
| 2 644 134 | 9/1990 | France . | |
| 35 08 100 | 9/1986 | Germany . | |
| 35 08 101 | 9/1986 | Germany . | |
| 1 001 594 | 8/1965 | United Kingdom . | |
| 2198400 | 6/1988 | United Kingdom | 244/23 C |

OTHER PUBLICATIONS

Bell Osprey V–22 publication.
NTIS Technical Notes No. 5 May 1 1986 U.S.A.

*Primary Examiner*—Galen L. Barefoot
*Attorney, Agent, or Firm*—Bennett Jones Verchere

[57] ABSTRACT

A hybrid aircraft is taught having VTOL, R-VTOL and S-STOL capabilities. The aircraft has a lifting body hull and four wing sections arranged in tandem which are pivotally moveable about their neutral axis. Each wing section has mounted thereon a pivotal propeller-rotor assembly for providing thrust substantially in a range between horizontal and vertical. The wings and propellers are integrated to the hull by an outrigger designed to be very stiff and to distribute forces from the wings and propellers to the hull. The hull is shaped to provide aerodynamic lift in an airstream and to facilitate construction by minimizing the number of panels of differing curvature required. The hull is formed of a pressure tensioned frame covered with semi-rigid panels, a lower cladding frame and bow and stem cladding nose cones. The semi-rigid panels covering the frame are formed of gas-tight and abrasion resistant laminate material and are connected to the frame by means of an interface rib and latch system. The frame is formed of a plurality of curved elongate segments arranged in series orthogonal to the long axis of the hull and connected by means of torsion members. A turbo-electric drive system can be used to drive the aircraft. An advanced hybrid aircraft is also described having about 8 to 12 high speed fans in place of the propeller-rotors.

43 Claims, 18 Drawing Sheets

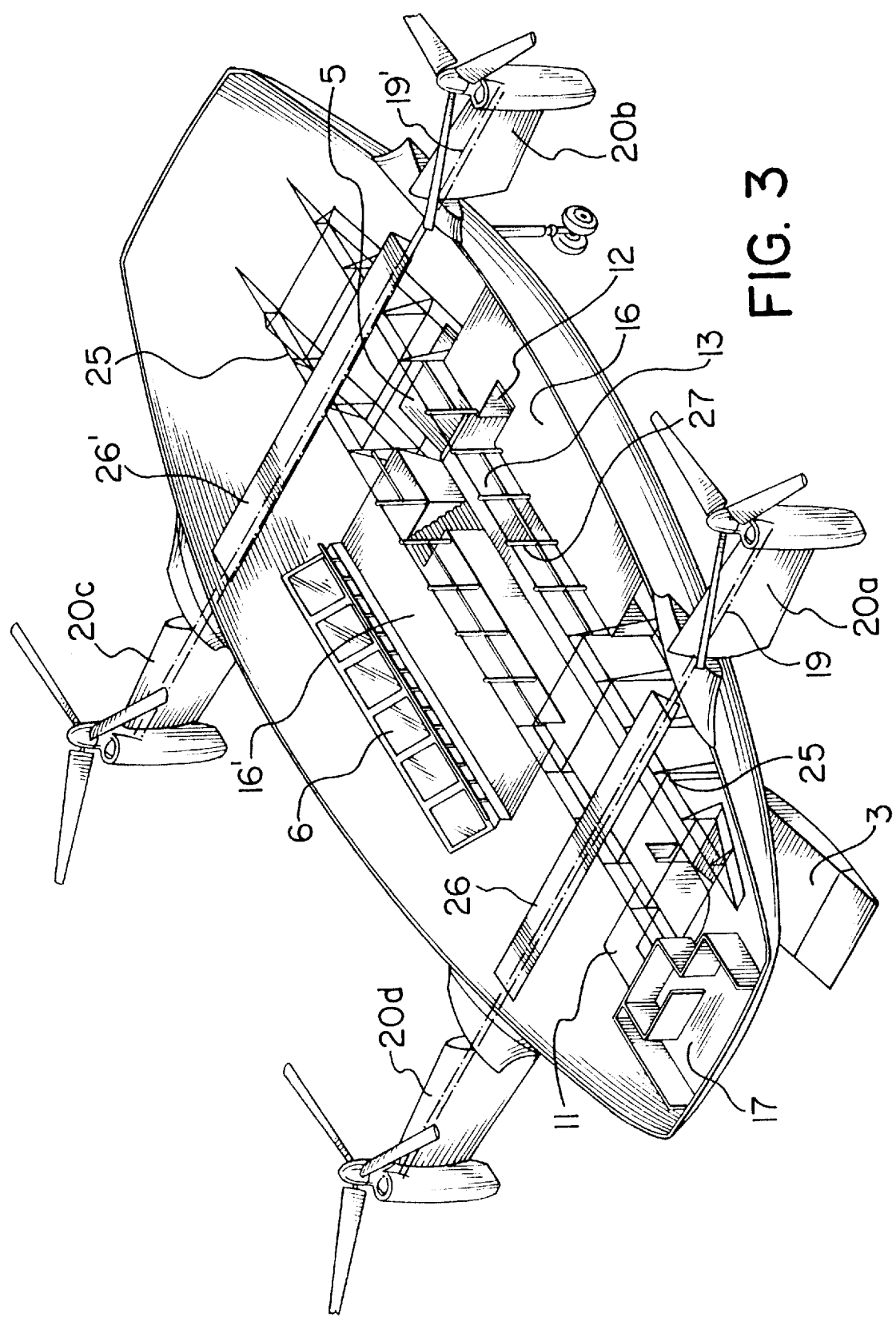

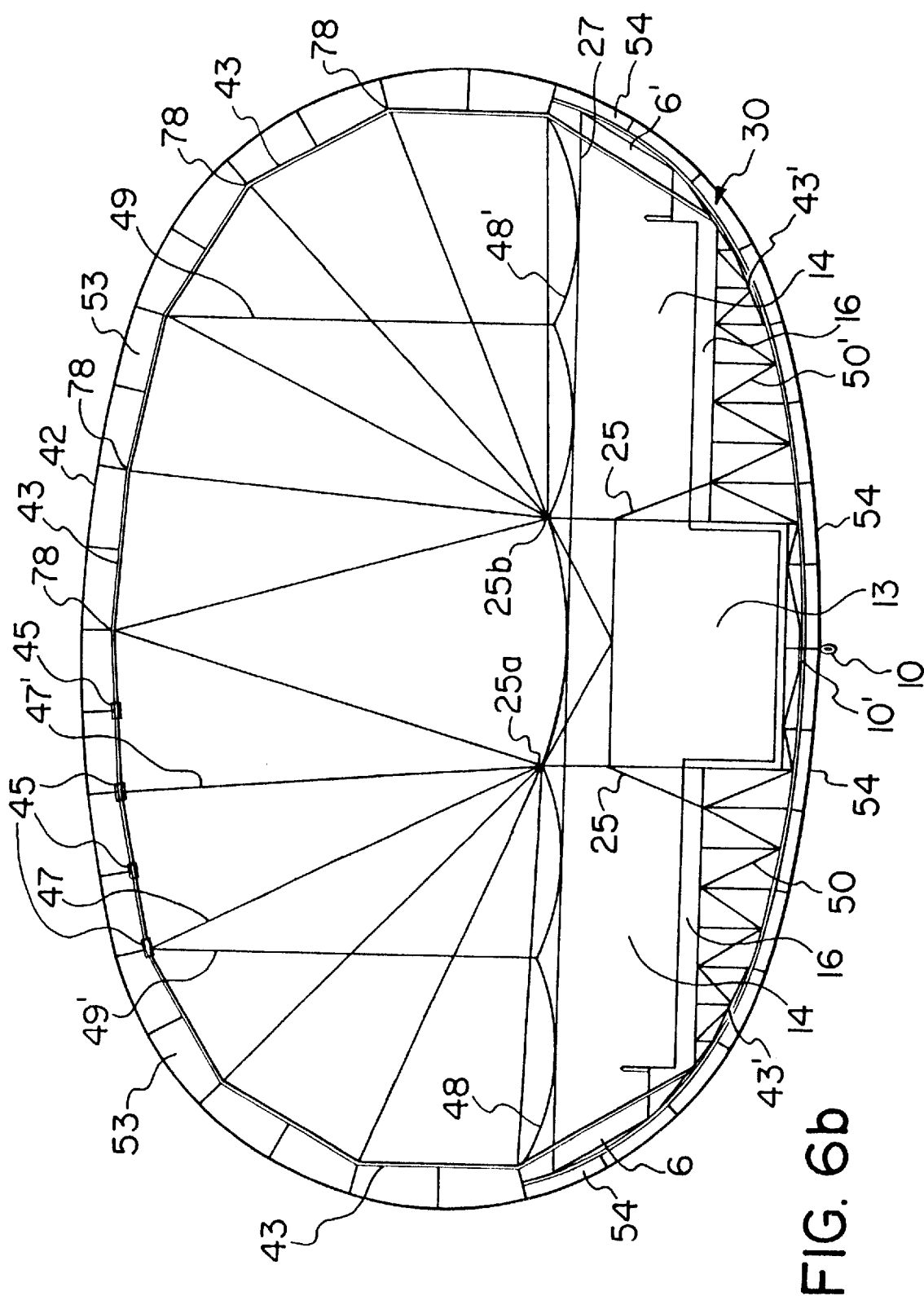

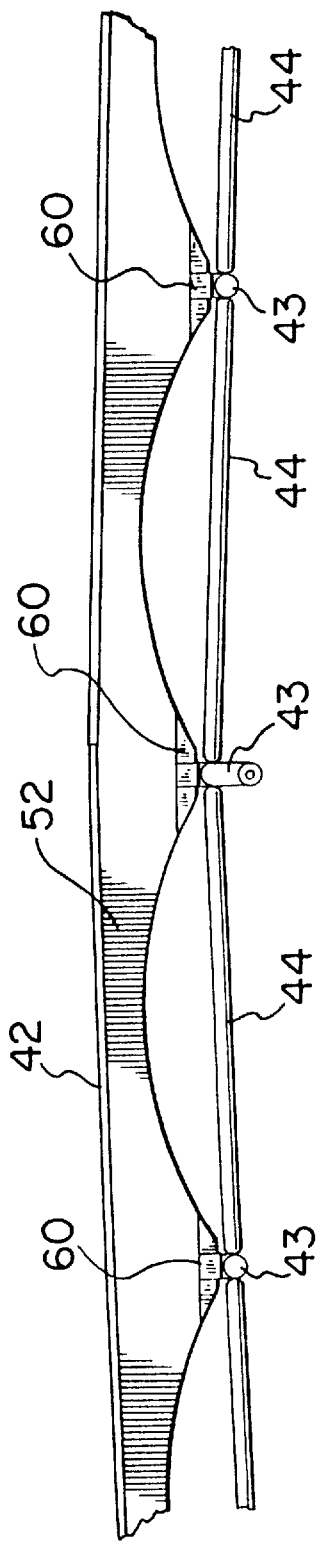
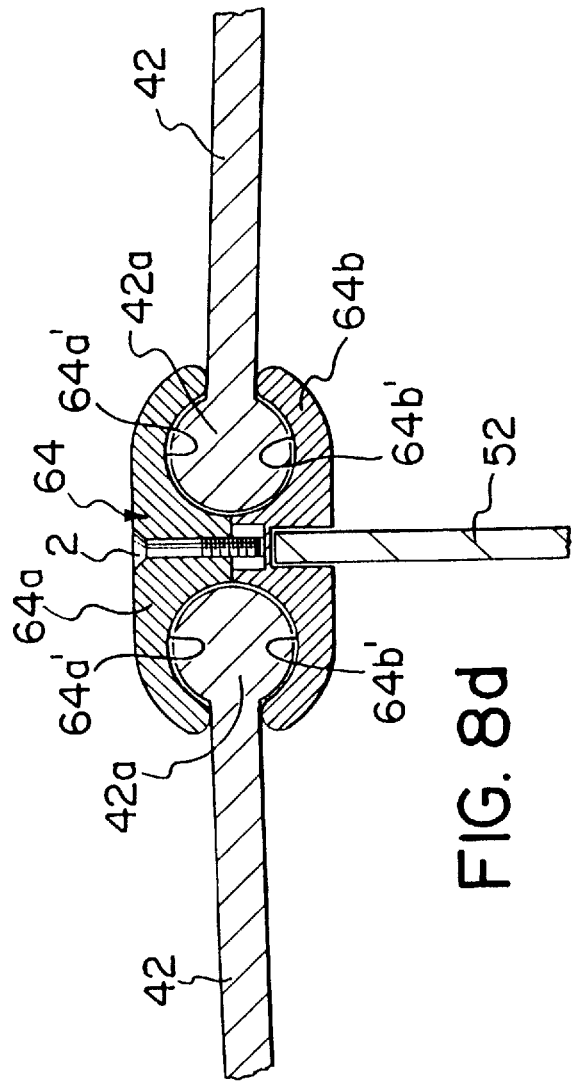

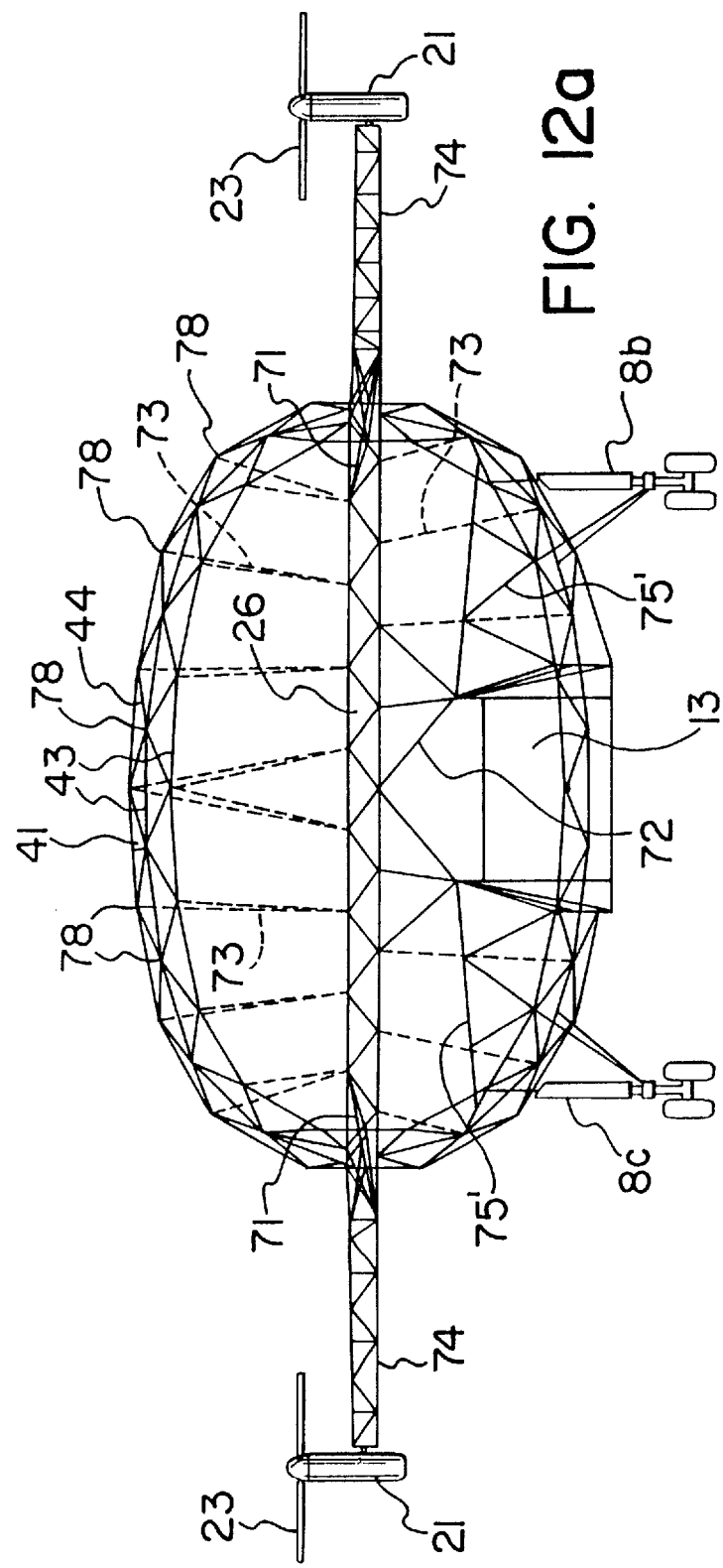

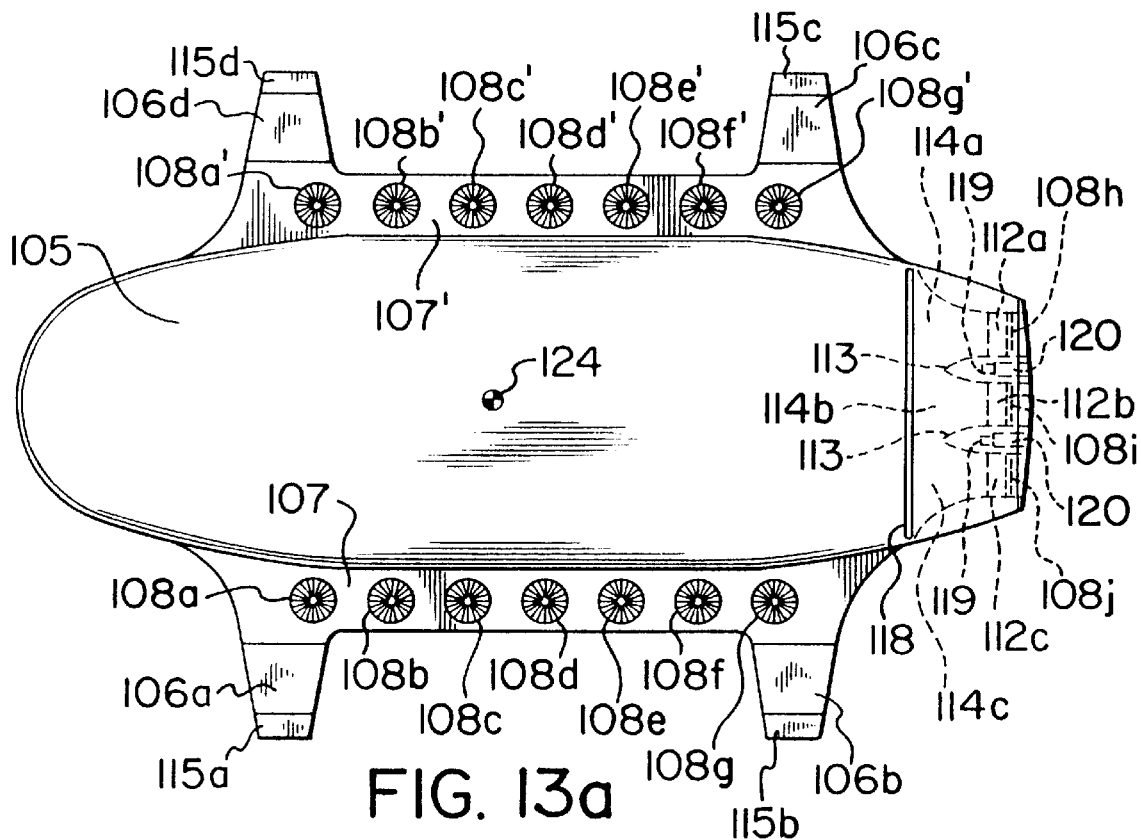
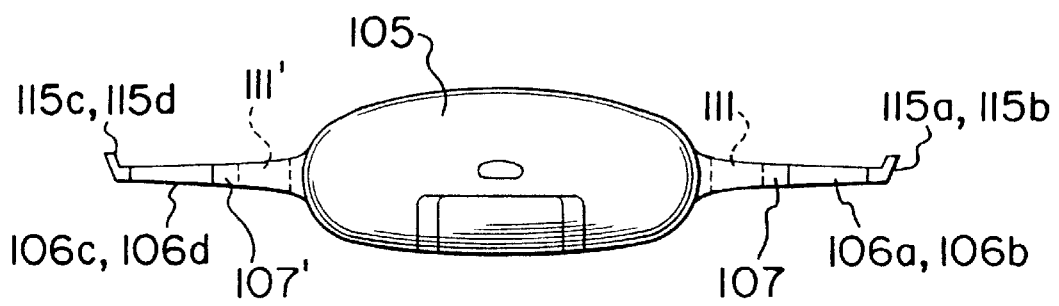

HYBRID AIRCRAFT

FIELD OF THE INVENTION

The invention relates to a hybrid aircraft and, in particular, a hybrid aircraft with vertical take off and landing (VTOL) and/or running vertical take off and landing (R-VTOL) and/or super short take off and landing S-STOL capabilities. The term "Hybrid" refers to the fact that the four known lift principles, dynamic, ground effect thrust lift and static lift have been incorporated into the aircraft design.

BACKGROUND OF THE INVENTION

The need to transport substantial cargo, and/or a large number of passengers over considerable distances quickly, efficiently and in a cost effective manner has led to a variety of medium to large (30–100 ton payload) aircraft designs restrictively successful in medium long range applications, where large ground infrastructures are available to support their operations.

No design is currently existent as to make available transport services with an appropriate balance so as to provide a medium (30–40 ton) payload capacity, with substantial cruise speeds of up to about 400 km/h, with wide body cabin comfort, heavy lift VTOL and Super-Short Take Off Landing (S-STOL) operational capabilities, with typically short to medium (150–1000 mile) range at good transport economics and with the ability to operate from either unprepared held sites, and/or underdeveloped and/or existing aviation ground structures while being functionally compatible with commercial aircraft traffic and operating patterns.

Novel airships designs emerged in the seventies and eighties, which can be seen as an effort to arrive at an aircraft design having the specified features. These airships, commonly termed lighter than air (LTA) aircraft, are based on predominantly buoyant lift principles. Given the use of static lifting gas, such LTA aircraft must be of enormous size and volume to obtain substantial (30–50 ton) lifting capacity. These aircraft have a number of severe deficiencies. They have poor low speed control characteristics, are very difficult to handle on the ground, and ballasting procedures make loading and unloading impractical. In addition, these aircraft cannot be accommodated in existing aviation support structures and, are unable to maintain speeds higher than 160 km/h because of the enormous drag penalty introduced by their large volumes resulting in poor transport productivity.

Efforts have been made to overcome the speed deficiency of LTA aircraft through the creation of "hybrid airships" as described in U.S. Pat. No. 4,591,112 by Piasecki et al. in which propulsive means are added to the LTA such that the static lift provided offsets the empty weight of the structures and propulsive means. This design is still unable to sustain higher speeds because it retains a large cross-section and corresponding substantial drag penalty. This hybrid airship also retains the corresponding ground handling problems due to excessive physical size. Its slow speed capabilities (110–130 km/h), are not particularly suitable for commercial use in the transport of passengers. It remains a typical special mission aircraft concept suitable for craning operation. A further critical engineering problem confronted by such design is the ability to address vibration forces introduced by the helicopter type propulsive means acting on the not well integrated largely space propulsive support and airframe structures.

Further, an effort to improve on hybrid airship resulted in the design of partially buoyant airships which derive some limited lift from their hull shape. An example of such airship is shown in U.S. Pat. No. 4,052,025 by Clark et al. This airship is truly a long range aircraft with extremely large dimensions which is unable to use existing aviation infrastructure. This airship is very complex and costly to construct with each fuselage panel having a different configuration. In addition, the helical wound base structure fuselage lacks rigidity which prevents he aircraft from attaining medium-high cruise speeds of about 400 km/h. Engineering problems are created as a result of its enormous wing span and other dimensions and, like LTA airships, this partially buoyant airship creates considerable ground handling problems. Further, this partially buoyant airship has no VTOL nor R-VROL capabilities. This type of airship can carry very large payloads over very long distances. However, when compared to other aircraft, such as the large jumbo jets, the partially buoyant airship is not competitive in terms of payload capacity and speed and overall productivity.

In yet another effort in the same category, a partial buoyant aircraft has been designed with emphasis on the application of a "jet flap" and in combination with a lifting body, as referred to in U.S. Pat. No. 4,149,688 by Miller, Jr. While the aircraft seems suitable for improved short take off and landing, its claim for VTOL capability will lack efficiency as the deltoid shape is not well suited for fitting with thrusters, particularly large scale thrusters, efficient in vertical thrust production. The rearward positioned thrusters, impede on a good VTOL performance, because their slipstream impinges on the rear top end of the hull. Further, thrusters, when in VTOL function, as in proposed positions fore and at the stern will lead to downwash ground effects severe unbalancing pitch moments of the aircraft in hover. Further, structurally, such deltoid fuselage are inefficient and costly to build.

Helicopters are convenient VTOL aircraft but are complex and costly to operate. Since a helicopter obtains all of its lift from its engines, it is unable to carry substantial payloads ($\geq 10$ ton payload) over medium (1000 miles) ranges as most useful load is consumed by fuel. It is particularly expensive to carry people and bulk break low density cargo using helicopter because of the severe restriction in available cabin space. Helicopters are nonetheless advantageous for carrying priority payloads into remote areas lacking aviation infrastructure or ground access, where their VTOL capabilities justify the expense. Attempts have been made to improve helicopter transport by increasing the size and numbers of rotors. However, these aircraft have not greatly improved the commercial viability of helicopter transport.

A further aircraft design which seeks to address some of the regional short haul (up to 500 miles) air transport problems is the tilt rotor aircraft, also known as the Bell Boeing V-22. The tilt rotor aircraft have large tiltable rotors which allow the aircraft to have both VTOL capability and horizontal thrust. This type of aircraft has fixed wings which provide for some dynamic lift. Like helicopters, the tilt rotor aircraft is costly to build and operate, it cannot carry heavy lift, large size cargo, and offers limited cabin space and comfort. It does not offer cost effective passenger transport capabilities. The primary advantage of the tilt rotor aircraft over the helicopter, is the ability to transport payloads at higher speeds. However, because of the substantially high cost of the tilt rotor aircraft, their only application has been limited to military delivery mission, where delivery speed is a consideration, and restricted to some selected reconnaissance special mission operations. As a result, to date there are believed to be no commercial applications of tilt rotor aircraft.

SUMMARY OF THE INVENTION

An aircraft has been invented which provides an appropriate balance of providing payload capacities of between 5 and 50 tons, useful cruise speeds over a range of distances, the ability to operate with both existing and underdeveloped aviation infrastructure and the ability to operate in unprepared field sites.

The aircraft is capable of VTOL or R-VROL and S-STOL, using about 30% runway length of conventional aircraft and has the ability to attain a medium cruise speed range of 300–400 km/h. The aircraft has a significantly enlarged cabin and freight hold space over conventional airplanes and helicopters, and has reasonable production, operation and maintenance costs. The aircraft of the present invention can be made to be a size comparable with conventional airplanes to allow accommodation in existing aviation maintenance and support structures.

Because of the versatility of the aircraft and its high cost effectiveness, its applications for use can vary widely. For example, the aircraft of the present invention is useful for combination transport of passengers and light priority cargo delivery or bringing heavy loads with combined R-VTOL and VTOL operational capabilities in regions lacking conventional air transport infrastructure. The aircraft is useful in slow or low flying operations, such as surveying, patrolling, or search and rescue. The aircraft is useful in highly developed industrial areas for point delivery of passengers and cargo on extreme short haul (150–300 km multiple stop shuttle type service routes.

An aircraft has been invented which has an airframe geometry-tandem wing configuration which provides for increased crash worthiness, due to substantially reduced take off and landing speeds of typically 90–150 km, a lifting body hull shape which substantially cannot stall and provides an air safety cushion beneath the hull in VTOL and R/VTOL.

In one aspect of the invention, the aircraft is comprised of a hull with a plurality of the wings shaped as airfoils about the hull. Each of the wings has a propelling means, such as for example, a propeller or rigid prop-rotor, mounted thereto. The wings are each pivotal moveable about their neutral aerodynamic pressure axis and the propelling means are also each independently pivotally mounted. The pivotal movement of the wings and propelling means is controllable and in combination provide for lift thrust forces, control thrust forces and forward thrust forces. In one embodiment, the pivotal movement of all elements is computer controlled so as to provide substantially instantaneous control forces, for example, in the presence of side gusts and the like.

The wings are pivotal about their neutral axis so that minimal force is required to make significant changes in the attitude of an individual wing. This allows substantially instantaneous application of forces vector generated as the prop slipstream acts on the wing to achieve control moments, for example, differential deflection of two wing sections, left and right, to counteract the rotational moment introduced by a side gust. Where greater forces are required to maintain the desired attitude of the aircraft, the rotors can be actuated to pivot to produce additional and substantial control forces.

In another aspect of the invention, the hull shape of the aircraft provides for the generation of a significant ground lift effect to assist in VTOL operations and significantly improving VROL lift performance. The ground lift effect is provided by a plurality of propellers spaced about the hull and disposed to create substantially vertical thrust. The propellers are positioned in spaced relation relative to the hull such that their slipstreams substantially do not impinge on the hull. With such a propeller configuration, at initial take off, 50% of the air mass being forced vertically down by the each of the propeller thrust columns is deflected by the ground surface to move inwardly beneath the hull. These air masses from each of the propellers impinge and are forced upwardly to cause a cushion of air beneath the hull acting upwardly to create a ground lift effect. Preferably, the propellers are selected to each have a direction of rotation toward the center point, in plan view, of the hull. For example, the four propellers can be counter-rotating fore and aft and left and right.

In another aspect of the present invention, the hull is to carry the main aerodynamic lift in R-VTOL and S-STOL. After reaching cruise, the hull is unloaded and up to 50% dynamic lift need will be supported by the wing sections. This improves the lift-to-drag ratio to values (8–11) comparable to wings of conventional design. The hull is shaped to provide varying degrees of camber in the upper and lower surfaces of the hull to thereby provide more of aerodynamic lift in an air stream. The aerodynamic hull lift allows the aircraft, when used in R-VTOL or S-STOL, to increase its payload capacity by 100–120% compared to design load capacity in VTOL operations. In a preferred embodiment, the dimensions of the aircraft hull are selected to both maximize the aircraft's cargo capacity and to minimize the drag picture thereby to optimize it transport productivity.

In yet another aspect of the present invention, the hull is constructed to have a rigidity to withstand flight speeds of about 400 km/hr. The hull of the aircraft is constructed of a plurality of transverse rings with modular torsion members disposed therebetween to form a triangulated geodesic-type, space shell frame. A hard outer composite shell is semi-rigidly mounted around the space shell frame. Added means of internal pressurization make the airframe a pressure tensioned tensile structure under normal cruise load conditions which increases the stiffness by about 50% compared to a non-pressurized vessel. The space shell frame is dimensioned to provide structural integrity to the airframe in the event of pressure failure. Safe flight operations can be continued with cruise speeds reduced to about 200–220 km/h.

The aircraft of the present invention can be driven by any suitable system. For example, a conventional drive train can be employed. In another aspect of the invention, a turbo-electric drive system can be used. A turbo-electric drive system comprises a central gas turbine engine and means to convey power to the propelling means. Such a system has various advantages over a conventional system including a reduction in weight and the avoidance of the requirement for a cross coupled transmission. In addition, the capability of installing the turbines internal of the fuselage provides for internal ducting of heated gases from the turbines. The exhaust gases in such an arrangement can be used for heat exchange purposes for heating the cabin, for channelling to prevent icing on critical surfaces or for use in the heating of gases for use in a static lift system, if desired.

In yet another aspect of the invention, a design of a lifting body hull geometry has been developed, leading to innovative construction methods in aviation which can be termed "large component airframe approach". This method allows the production of an airframe from a significantly reduced amount of different air frame components. The various parts of the airframe can be broken down in such a way that a smaller number of medium sized beams plate and panel elements can be produced using composite forming techniques other than expensive auto-cleave curing. Jointing techniques and self aligning components facilitate the ease of assembly of such an aircraft. Due to lower speed and reduced aerodynamic loading, less expensive materials such as Kevlar R, E-Glass and formable thermo-plastics can be used.

The propelling means of the present invention can be any suitable type, for example propeller-rotors or high speed fans. Where high speed fans are used, they are disposed about the hull body and this aircraft has been termed the "advanced hybrid aircraft" (AHA Ship). Preferably, 8 to 12 fans of, for example 2.5 to 4 m diameter, are mounted about the horizontal center line of the hull and are fitted with thrust deflectors for a range of directional thrust. Other fans can be mounted to provide directional or forward cruise thrust, for example at the stem of the hull. This aircraft provides excellent directional control in all flight modes.

Thus, in accordance with a broad aspect of the present invention there is provided an aircraft comprising: a hull, a plurality of wings shaped as airfoils mounted about the hull in spaced apart relation, each wing being mounted to be pivotal moveable about its neutral aerodynamic pressure axis and a propelling means mounted on each wing and being pivotally moveable independent of the wing.

In accordance with a further broad aspect of the present invention there is provided an aircraft comprising: a hull having an upper surface and a lower surface and a geometrical center point, a vertical axis passing through the center point, a plurality of propelling means mounted on the hull in spaced apart relation about the center point, the propelling means each being disposed to provide thrust substantially parallel with the vertical axis and to create a slip stream directed toward the lower surface of the hull, the lower surface being shaped to trap the slip stream which is deflected beneath the hull.

In accordance with another broad aspect of the present invention there is provided an aircraft comprising: a hull having a longitudinal axis and shaped to provide substantial aerodynamic lift in an air stream, the hull having an aspect ratio of between about 1 to 2.5 and a hull chord thickness ratio of between about 3 to 4.5.

In accordance with a further broad aspect of the present invention there is provided an aircraft hull having a cross sectional shape comprising four arc segments connected tangentially.

In accordance with another broad aspect of the present invention there is provided an aircraft comprising a hull having a longitudinal axis, the hull including a plurality of frame sections in series each positioned substantially orthogonal to the longitudinal axis and a plurality of torsion members disposed between adjacent frame sections in series, the rings and torsion members interconnecting to form a triangulated frame.

In accordance with another broad aspect of the present invention there is provided an aircraft comprising: a hull having a plurality of wing sections attached thereto and a plurality of propelling means, the propelling means being driven by a turbo-electric drive system including a gas turbine, an alternator and a power conditioning and transmission system to deliver power generated by the gas turbine to the propelling means.

In accordance with a further broad aspect of the present invention there is provided an aircraft comprising: a hull shaped to provide substantial aerodynamic lift in an air stream, a plurality of wings mounted about the hull, a plurality of high speed fans disposed about the hull and having a thrust deflecting means mounted in association with the fans to provide a range of directional thrust.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 3 is a perspective view into the lower fuselage with the top portion of the lifting body hull surface removed;

FIG. 6b is a cross section along line 6b—6b of FIG. 6a;

FIG. 8c is a side view showing a rib section interfacing between the space shell frame and the outer cover panels;

FIG. 8d is sectional view of an outer cover panel connector;

FIG. 12a is a cross section through a hull station with an integrated carry through beam;

FIG. 13a is a plan view of an alternate AHA ship;

FIG. 13b is a schematic front elevational view showing the thruster arrangement in an alternate AHA ship;

FIG. 13c is a schematic side elevational view showing the thruster arrangement in an alternate AHA ship; and, FIG. 13d is a cross sectional view through a fan unit useful in the alternate AHA ship of FIG. 13a.

DETAILED DESCRIPTION OF THE PREFERRED EMBODIMENTS

The detailed description of the invention will start with a global overview of the main features of the aircraft and the main building blocks of the airframe. It will then proceed to the aspects of "simple geometry" being the base for ease of production, and then proceed to specific inventive mechanical aspects of the pressurized hull structure, describe then the control aspects, followed by the description of an advanced propulsion system particularly suited to the invented aircraft. Last, a second alternate embodiment of the hybrid aircraft of the present invention will be presented.

Figure 1:
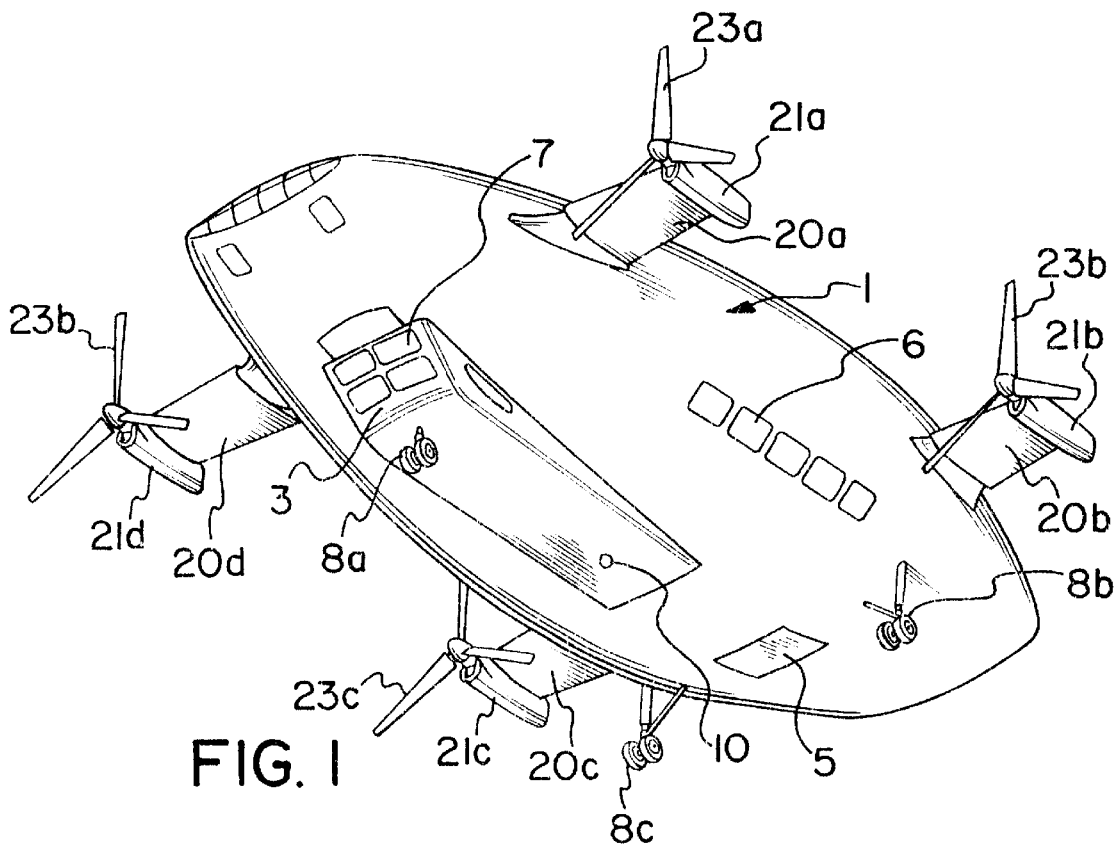
FIG. 1 is a perspective view of the aircraft showing the overall external configuration, having the propellers in the horizontal thrust position.
Figure 2:
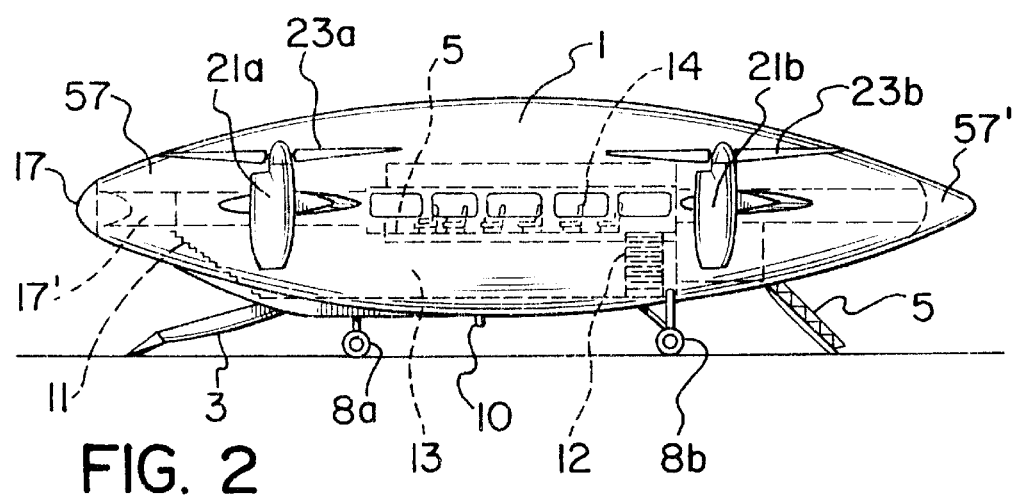
FIG. 2 is a side elevation view of an aircraft according to FIG. 1, having its propellers in the vertical thrust position and showing the cabin and cockpit arrangement.
Figure 9A:
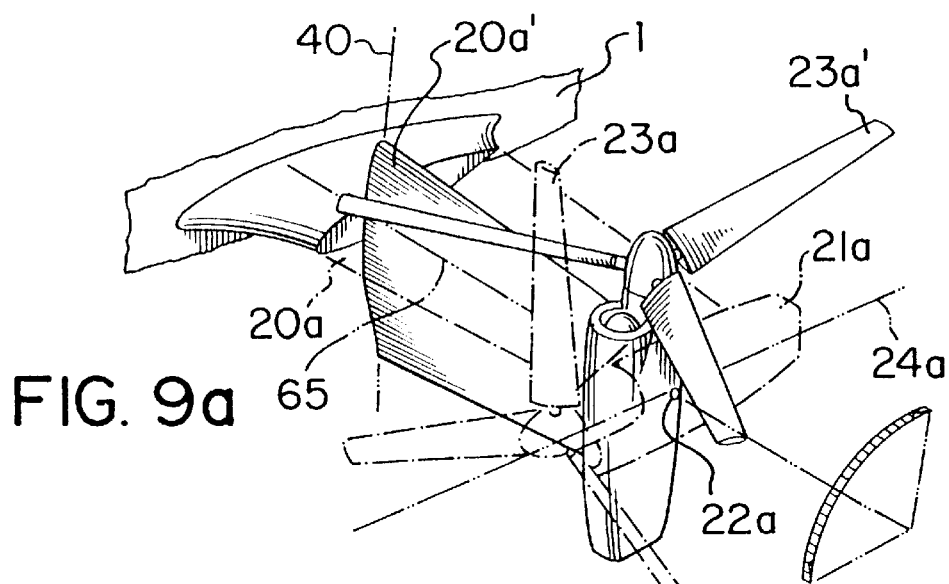
FIG. 9a is a perspective view of a propeller and a wing section according to the aircraft of FIG. 1, showing pivotal ranges useful in the present invention.
Figure 12B:
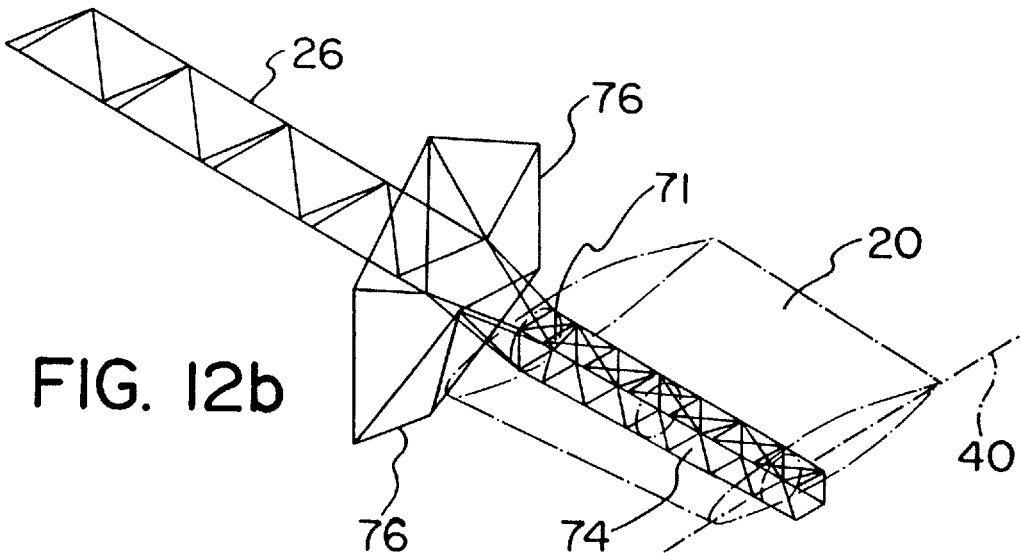
FIG. 12b is a perspective view of the internal frame at the interface of a carry through beam and an outrigger.

Referring to FIGS. 1, 2 and 9a, a preferred embodiment of the Hybrid Aircraft (HA), also called the "aircraft", according to the present invention is shown. The aircraft is comprised of a lifting body hull 1 and four of thrust generating prop-rotors 23a, 23b, 23c, 23d mounted fore and aft about the center line on both sides along the hull at the end of outrigger 74 (FIG. 12a and 12b). Four wing sections 20a, 20b, 20c, 20d configured in a tandem fashion, best seen in FIG. 1, are mounted to rotate pivotally about the outriggers at their neutral aerodynamic pressure axis 65 (FIG. 9a). The four thrust generating prop-rotors 23a, 23b, 23c, 23d are driven by engines housed by nacelles 21a, 21b, 21c, 21d and are installed to provide, in horizontal position (shown in phantom in FIG. 9a), thrust to propel the aircraft forward, and, in the vertical position, static vertical thrust lift and control thrust simultaneously in VTOL, hover and R-VTOL. The axis of rotation 24a of the prop-rotors can be rotated individually and are independently pivotal about axis 22a passing through engine nacelle 21a through typically a range of from −10° to 90°, relative to vertical. Preferably, axis 65 of wings 20 is common with axis 22 prop-rotor assemblies 21, 23. As will be discussed in more detail hereinafter, each prop-rotor assembly 21a, 23a consists of the prop-rotor and an engine, a gear box, a lubrication system, an interface to cross shafting housed with the nacelle. Cross shafting 1g, 1g (FIG. 3) is installed in internal of the hull in carry through beams.

Referring to FIGS. 1, 2, 3, 6a and 6b the layout of the main subsystem components and the main load carrying and distributing structural elements of the overall "HA" airframe are shown. In the lower portion of the lifting body hull 1, a large keel 25 is integrated. Above keel 25, two carry through beams 26, 26' run perpendicular to the keel 25, fore and aft through the hull 1. These beams 26, 26' are connected to the keel 25 and the space frame shell structure 41. Additional beam truss structures 75, 75' (FIG. 12a) interface with the keel 25 and shell structure 41 and run across the lower bottom hull, outwardly from the left and right sides of keel 25 at the position of the rear landing gear 8b, 8c. Beam truss structures 75, 76' absorb and redistribute the loads from the landing gear 8a, 8b, 8c into the keel 25 and the lower portions of the hull 1. The landing gear is a conventional tricycle land gear arrangement 8a, 8b, 8c. A hard point, for external cargo lift operations, is provided and includes a hook 10 external to the lower mid section of hull and a truss reinforcement 10' within the hull. Structurally it is integrated into the keel 25.

Transverse ribs 50, 50' are also formed in the lower hull. These ribs 50, 50', having truss construction, are integrated to the shell 41 and the keel 25 and follow the lower hull curvature. Keel 25, beams 75, 75' and transverse ribs 50, 50' together provide the strongest portion of the airframe. The lower hull is defined by a shell 30 formed by box plate elements 54 which are connected in such a way as to contribute additional stiffness to the hull. This lower hull shell 30 of the aircraft functionally requires the highest mechanical surface stiffness. Significant aerodynamic and mechanical surface forces are acting on the lower shelf 30 due to impact loads occurring in ground handling, by ground effect, for example, impact of gravel at VTOL, and when landing on water.

Preferably the aircraft also includes a close out structure 48, 48' which separates the upper half of the hull interior from the lower half of the hull interior, a lower cabin 13 formed within keel 25, upper cabins 14 formed by decking 16 and floor beams supported over ribs 50, 50'. The double deck concept offers significant advantages over conventional aircraft holds since the light volume loads, for example passengers or parcels, can be carried in the upper cabins 14, while lower cabin space 13, is configured to be practically suited for denser cargo and can tolerate heavy point loads. Assuming a typical hull width of 6–7 m of the lower deck cabin for a 30 ton commercial payload "HA", substantial additional cabin surfaces, for example up to 110% of the size of lower cabin can be realized by adding decking 16 to form upper cabin 14. In this way, 100% of the design load of the aircraft by weight can be realized. Upper cabin can accommodate low density cargo of 7–10 lb. per cu.feet or additional passengers. This is of particular operational advantage when the aircraft is operated in R-VTOL or S-STOL mode, since it can lift 100% to 120% more payload compared to its operations in VTOL.

To facilitate transport of passengers, staircases 12a, 12b are provided for access between lower cabin 13 and upper cabin 14. In addition, a rear access door a is provided. Loading and unloading of freight can be performed through a large front ramp 3 which opens into lower cabin 13. This can be done without special loading or unloading equipment and can shorten reduce the time for loading and unloading. Also, large windows 6 can be conveniently installed in the upper cabin 14, feasible due to much lower pressure differential between cabin and ambient air space than in conventional aircraft. This design feature of the main top passenger cabin 14 having large windows 6, for example having dimensions of 4×6 ft, can allow for a particularly attractive viewing experience from the aircraft, which typically may travel at altitudes between 8,000 and 12,000 feet. Viewing ports 7 can be integrated into the front ramp 3 to allow for viewing from the lower cabin 13.

The shell 41 extends from about 18% to about 85% of the hull length. It is formed by series of transverse rings 43 and torsion elements 44 connecting these rings and resembles a geodesic type structure in appearance. The shell structure 41, due to its basic inherent triangulation, provides a very stiff, rigid internal body shell which is optimized to absorb torsion forces about 100 times better than a classical Zeppelin-type ring and longitudinal beam construction. For ease of construction purposes, this shell structure part 41 of the hull 1 can be broken down into segments 43' (FIG. 6d) containing 3–4 rings 43 with corresponding torsion members 44 forming together a hull segment of typically 5–7.5 m in length. An assembly of 5–10 segments, depending on hull size, typically forms the whole shell. About the shell 41, cover panels 42 are mounted in a semi flexible manner as to provide a pressure tight and aerodynamic cladding of the hull 1.

The space shell frame structure 41 is provided with stiffened rings (not shown) at its ends which allow the attachment of the tapering front hull cap 57 and tapering rear hull cap 57'. Caps 57, 57' are self-supporting and are produced from the same box plate elements 54 as lower hull shell 30. Referring to FIG. 6c, these elements 54 are formed of sandwich composites including Kevlar, graphite, honeycomb and Kevlar combinations. These elements facilitate modular construction of the end caps 57, 57'.

In the relative voluminous upper interior portion of the hull 1, significant space is available for accommodation of a static lifting gas, for example, helium or hot air, if desired. The inclusion of such lifting gas is particularly useful if the aircraft is to be used for VTOL. Alternately, or in addition, large equipment, such as for example, wide aperture radar equipment useful in sensor platform missions, can conveniently be installed in this space, if desired.

The hull, including the shells 30, 41, covering 42 and caps 57, 57 "are preferably maintained in tension. Even while on the ground some residual amount of internal pressure, for example 1–1.5" WC is required, to keep the airframe and the hull in this preferred tensioned state. Thus, for all practical purposes, closeout structure 48, 48' is required to be pressure tight to separate the cabins 13, 14 and doors 3, 5 from the upper interior of the hull. The material of the closeout structure 48 is a flexible membrane structure, or sandwich composite, which is thin having a thickness of for example, 1 to 3 mm and formed of a fewer layers than conventional fuselage sandwich composites. The close out structure is supported away from the cabin 13, 14 by keel 25 and a tent like frame work of beams 27 and suspension cables 49.

Definition of a fuselage shape controlling geometry

Referring to FIGS. 1, 2, 4a and 4b, the hull shape 1 is based on a simple and locally symmetric geometry and is generally elliptical in cross section and tapered toward the bow 1' and stem 1". The overall hull 1 size, i.e. As equivalent wing surface, is determined by the required R-VTOL or S-STOL lift capability of the aircraft and the desire to take off at low speeds of typically 90–135 km/h. The hull geometry further provides for good aerodynamic cruise drag performance in terms of a satisfactory lift-to-drag-ratio, for example 8–12 designed to balance, with the propulsive power required in VTOL, at a medium high cruise speed of typically 300–370 km/h. Further, the hull geometry facilitates the formation of large "air cushion" with symmetric ground effect patterns which impinge beneath the aircrafts center of gravity and the aerodynamic center of the hull. The hull 1 shape is rounded to make use of internal pressurization to stiffen the lifting body hull and provides a shape suitable for landing on water surfaces with a minimum draft of typically, 25 mm. The shape supports low production cost, the semi axis symmetric cross section supports the use of repetitive plate elements in the production of the airframe needing only a small number of different molds, typically 40–60 units.

For convenience, the standard geometry convention is followed in the description of the hull geometry, as follows: the x-axis is the horizontal axis across the width of the craft; the y-axis being the vertical axis; and the z-axis is the axis along the length of the craft. The hull cross section contour consists of 2 smaller arc segments 30, 30' and 2 larger arc segments 31, 31' with tangential end conditions. Angles $\alpha$ and $\beta$ quantify the rotational distance of the ends of arcs 30, 30' from the x-axis.

It is important to notice that the cross section is close to being elliptical, but mathematically not congruent with the contour of an ellipse. The cross sectional dimensions of the hull change with a given station length "z" value along the z-axis of the hull. According to the known laws of geometry, a relationship for the maximum hull width X (x) and maximum height Y (x) value of each cross section can be determined, as follows:

The hull width value is:     $X = (0.5 * x_1 * R_{0max}) + r_n(X)$
The upper hull height value is:     $Y = (f) \alpha, (x_1 * R_{0max}) + r_n(X)$
The lower hull height value is:     $Y = (f) \beta, (x_1 * R_{0max}) + r_n(X)$, wherein $x_1$ can assume values of between 2 and 3.5; $R_{0max}$ is the selected maximum diameter of the original body of revolution; and $r_n(x)$ is the discrete radius of each smaller arc (30, 30' in each hull section, n, along the z-axis.

The hull cross section is generally a body of revolution cut in half, with an original maximum radius $r_{0max}$ 30 with a constant mid section 32 inserted in between the centers of the two arcs 30 and 30'. The selection of the base radius $r_{0max}$ determines the basic maximum height of the hull. The determined $r_{0max}$ multiplied by a factor x determines the width of the constant mid section 32, and thus the aspect ratio of the fuselage. The discrete value x depends mainly on the amount of dynamic lift to be supported by a given hull at the desired take off speed. To achieve overall good structural low airframe weight and good aerodynamic performance, the constant mid section 32 has to assume values between $2* r_{0max}$ and $3.5* r_{0max}$ varying the aspect ratio between about 0.75 and 2.5.

Another variable of use in varying the hull cross section geometry is the selection of the angles $\alpha$ and $\beta$, of the arcs about the x-axis. In order to improve dynamic lift conditions for the same size lifting body hull, different arc angle values $\alpha$ and $\beta$ can be used. For the lower portion of the hull, arc angles $\beta=75°-85°$ have been determined most suitable, while for the upper portion of the hull the arc angles $\alpha=60°-70°$ have been found to be preferable. This geometry allows the hull 1 to have more camber on its top arc 31, will create more dynamic lift. As known, high camber airfoils increase the lift coefficient significantly for the same wing reference surface area. At the same time the increased camber of the upper hull relative to the lower hull facilitates the production of a substantially fail safe fuselage by making the underlying shell frame members more arched, and thus less prone to what is known as "snap-through" failure. This is particularly significant in modes under bending stress induced by maximal vertical gust loads and where the pressurization system of the hull has failed.

Likewise, resulting from above method, the lower angle $\beta$ at 75°–85° lets the lower portion of the hull to have a less pronounced curvature 31' than the upper arc 31. The resulting, substantially flat hull bottom surface facilitates ground lift effect by trapping air to create a pressure build up beneath the lifting body 1. The potentially weaker structure of the flatter lower hull 31' is offset by the presence of the massive stiffening keel 25 and ribs 50, 50' installed along the middle lower portion of the hull 1.

Figure 4A:
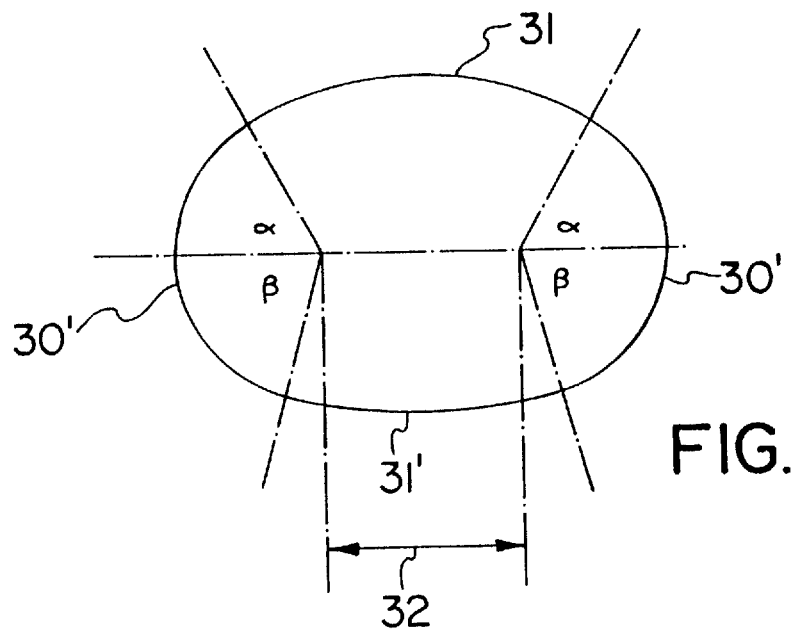
FIG. 4a shows the geometric principles in the constructions of the hull as seen in cross section.

As shown in FIGS. 2 and 4a, the succession of variations in cross section with typical hull segment thicknesses of 1.5–3 m, form in their overall assembly typically a fully or a halt symmetrical air foil shape. This airfoil of short aspect ratio, can have chord-length to chord-thickness ratios of between 1:3.5 to 1:5, i.e. 20–28% chord thickness in side view. Such an aircraft having a body of medium slenderness is more efficient to resist structural deformation due to bending moments acting on the hull in cruise flight.

Applying the above-described method, optimum surface to volume ratio hull shapes with good aerodynamic performance capabilities can be obtained while having finesse ratios of between about 3 and 4.5.

Figure 4B:
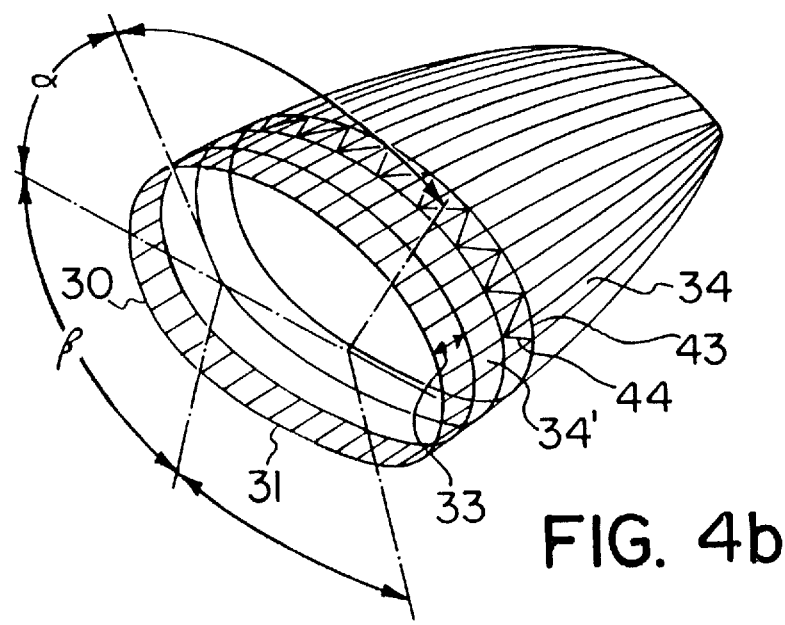
FIG. 4b is a schematic perspective view showing the geometric principles in the construction of the hull components.

Referring to FIG. 4b, each arc length 30, 30', 31, 31' can be subdivided into a selected number, n, of arc segments, typically to yield optimized arc length of 1–1.5 m, and the length of the hull can be divided into segments of typically 2.5 m. By use of such segmentation, the hull can be covered with panels requiring only 2 or 3 variations of curvatures. This segmentation can also apply to the hull ring 43 and torsion members 44. Significant reduction in component production and assembly costs result. Additionally, for certain applications, the hull design 1 can be made essentially symmetric fore and aft, as shown in phantom and indicated as 39 in FIG. 5b, thus reducing the number of airframe components which are different in shape by 50%.

Lifting Body Hull and Quad-Rotor Thruster Arrangement

Figure 5A:
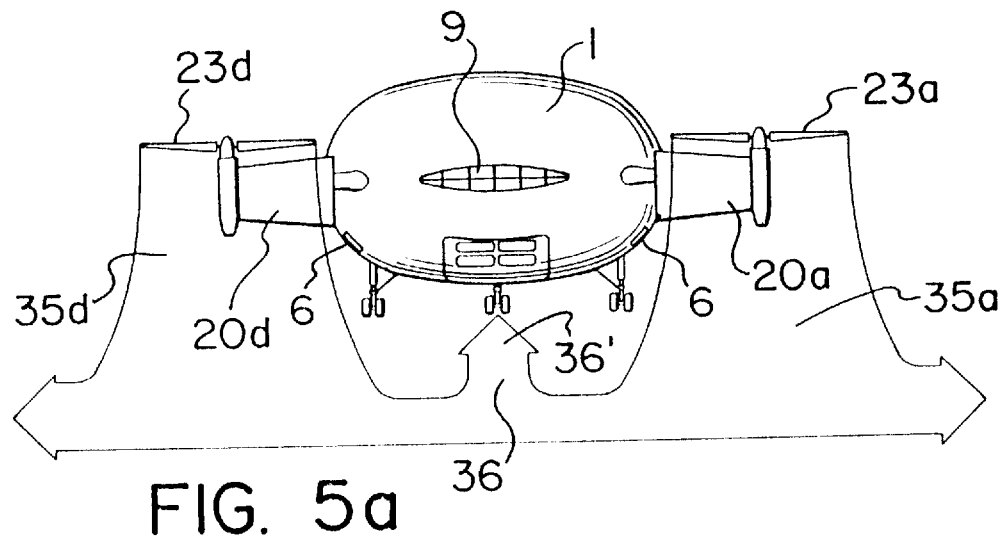
FIG. 5a is a front elevational view illustrating the ground lift effect principles.
Figure 5B:
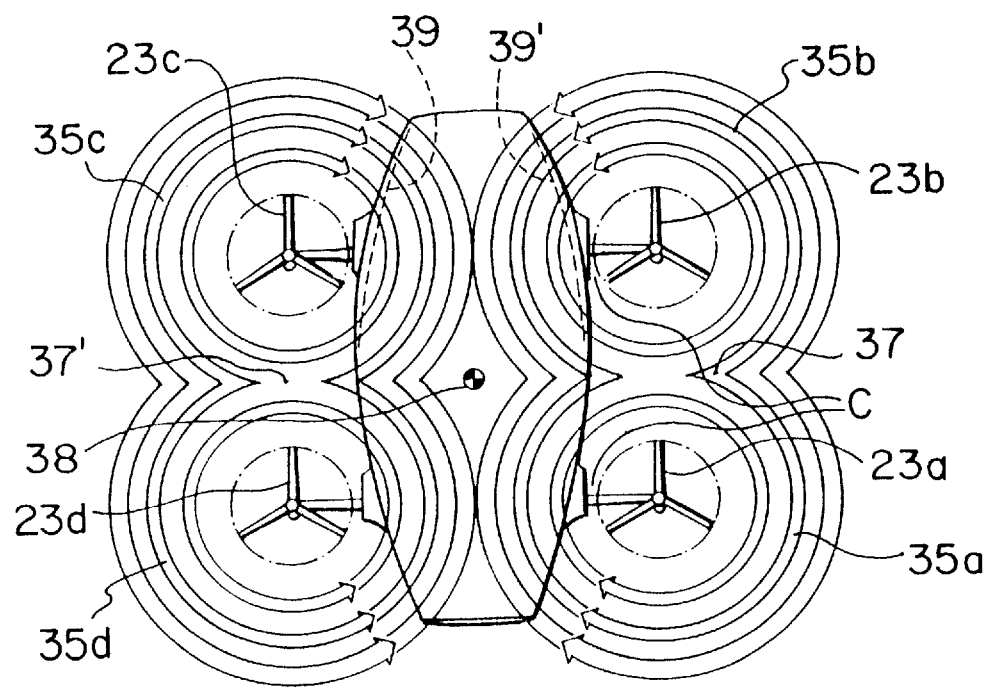
FIG. 5b is a plan view illustrating the vortex patterns created by the quad position thrusters beneath the lifting body hull.

Referring to FIGS. 5a and 5b, in VTOL or hover mode, with an aircraft, as shown, having a symmetric hull and four prop-rotors, termed a "quad-rotor" arrangement, or in an alternative embodiment having more than four thrust generators, 50% of the air moved downward in all thrust dawn wash columns 35a, 35b, 35c, 35d, after hitting the ground, is being deflected inward beneath the hull, as shown by the arrows in FIG. 5a. All these combined counter-rotating vortex disks of air impinge, as indicated at 36, beneath the hull and intersect below the center of gravity 38, which is substantially the same as the aerodynamic center. When the air vortexes impinge, they create a zone of increased air pressure which is thrust 90° upward and form a supportive cushion of air, as indicated at 36'. This causes a fountain effect. The proper placement of the prop-rotors 23a, 23b, 23c, 24d and resulting downwash columns 35a, 35b, 35c, 35d act as "curtains" to trap the air under to the relatively wide hull. Counter rotation of propellers fore 23a, 23d and aft 23b, 23c and left and right improves this effect, and is preferred. With such counter-rotating props only two gaps 37, 37' are available for the air to escape. The preferred hull shape embodiment therefor should be a symmetrical contour 39, or close to being a symmetrical body, as shown by hull 1.

Experimentation with a 6 m model representing the "HA" hull-rotor geometry has confirmed the validity of this concept and provided detailed scientific data on the actual lift improvement achievable. It has been found that where the distance between the ground and the lowest point of hull curvature is equal to the prop diameter, a ground lift effect force equal to 30% of the original thrust force delivered by the propellers can be obtained. With closer ground proximity, for example distances between the ground and the lowest point of the hull of between 0.35–0.50× the prop diameter, even stronger ground lift effects, for example of up to additional 36% of original thrust generated, have been measured. In particular, prop disk loading of $\geq 80$ kg/m$^2$ support this affect.

Geometry to Minimize Hull Interference During Prop-Rotor Vertical Thrust

Referring to FIG. 2, to avoid lift loss induced by air being drawn over the hull to feed the propeller, particularly when propellers are positioned for aircraft hover or VTOL, the rotors are placed outside of the outer perimeter of the hull in plan view. In the preferred embodiment, the horizontal propeller plane of rotation is substantially at the same vertical position as the height of the outer hull curvature at the corresponding locations along the length of the hull. The resulting airflow is almost tangential to the propeller plane and thus minimizes down draft effects, where the air feeding into the propellers is drawn over the hull surface. The clearance, indicated as C in FIG. 5b, between the outer limits of the propeller rotation and the outer perimeter of the hull, in plan view, should preferably be at least 15–20% of the prop diameter.

Differential Hull Wing Section, Propeller Tilt Capability

The lifting body airframe 1 provides the basic structural frame work, to which externally, the propulsion system is attached. Referring to FIGS. 9a, 9b and 12a–12c, the large diameter prop-rotors 23a, 23d are mounted at the end points of cantilevered outriggers 74a, 74d. Tiltable wing sections 20a, 20d are mounted between the hull and the prop-rotors 23a, 23d. The chord center line 40 of these wing sections can be pivoted independently from the tilting of the prop-rotors. Preferably, the wing sections are mounted to rotate and be positioned within the range of from −10° to 130°, relative to a horizontal axis with the usual positioning in cruise being 1°–5°, 40°–75° in R-VTOL and up to 130° in certain hover flight control conditions. The rotor axis 24 is typically tilted in a range of from 0° to 110°, relative to horizontal, with the prop axis being generally 0° in cruise flight, 90° in hover and various other positions for control and take off modes. Typically, a differential angle of up to 23° between rotor axis positioning and wing position are usefully practical.

Numerous benefits result from this differential tilt capability. In particular, there are three benefits which represent a major improvement over the existing tilt rotor technology. Referring to FIG. 9a, showing a vertically oriented wing section 20a', and a horizontally oriented wing section 20a, shown in phantom. First, the present invention allows the reduction of pylon lift loss in VTOL and S-STOL. With wing section 20a' in this vertical position, blockage of the propeller slipstream is substantially avoided and down wash drag over the outrigger 74 of the wing is reduced to about 1.5% VTOL lift loss compared the values of 8% VTOL lift loss commonly resulting where a fixed, non-tiltable wing is used as a support pylon for a tiltable prop.

The wing section angle of rotation can be kept positive above prop angle of rotation at all times at S-STOL and in transition to cruise. In contrast to conventional fixed wing-tilt rotor aircraft, this arrangement not only prevents thrust lift losses but increases the dynamic lift generated, or, inversely, can be used to decrease lift at S-STOL landing. Additionally, the wing sections 20a, 20b, 20c, 20d in presence of the a propeller thrust slipstream becomes a blown wing section 20 providing lift and control at very low speeds, for example below 80 km/h. This is particularly beneficial in maintaining attitude control in the final moments of the landing process.

Dynamic lift improvements in S-STOL and transition flight and better aircraft handling characteristics result.

Thirdly, the independent tilting of the four wing sections 20a, 20b, 20c, 20d allows the distribution of required dynamic lift between the four wings to sustain cruise flight. Depending on the speed and the flight modes, the dynamic lift required for any given point of the flight envelope to keep the aircraft airborne is being supplied by the sum of the lift forces produced by the lifting body and the four wing sections. As the lifting body 1 has a significantly smaller aspect ratio than the wing sections 20a, 20b, 20c, 20d, it therefore produces more induced drag for a certain amount of dynamic lift produced. It is, thus, advantageous to unload the lifting body at cruise speed and allow the 4 wing sections make up the portion of the dynamic lift shifted away from the hull. The four wing sections 20a, 20b, 20c, 20d will produce the same amount of dynamic lift with significantly less overall drag penalty then the lifting body 1 carrying 100% of the dynamic load by itself.

The Pressurized Rigid Fuselage with Flexibly Suspended Outer Shell

Figure 6A:
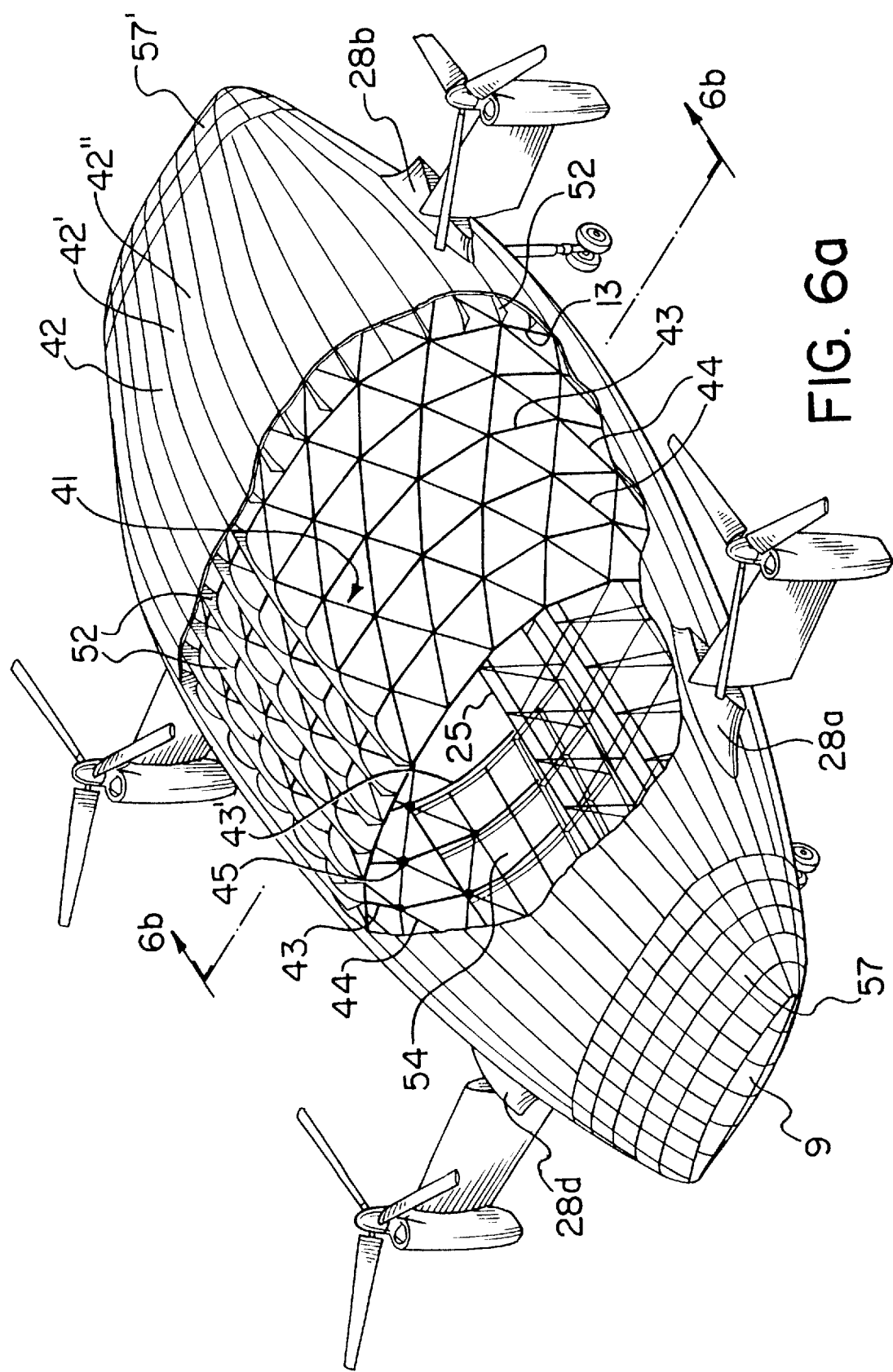
FIG. 6a is a perspective view of the fuselage showing the construction elements.
Figure 6C:
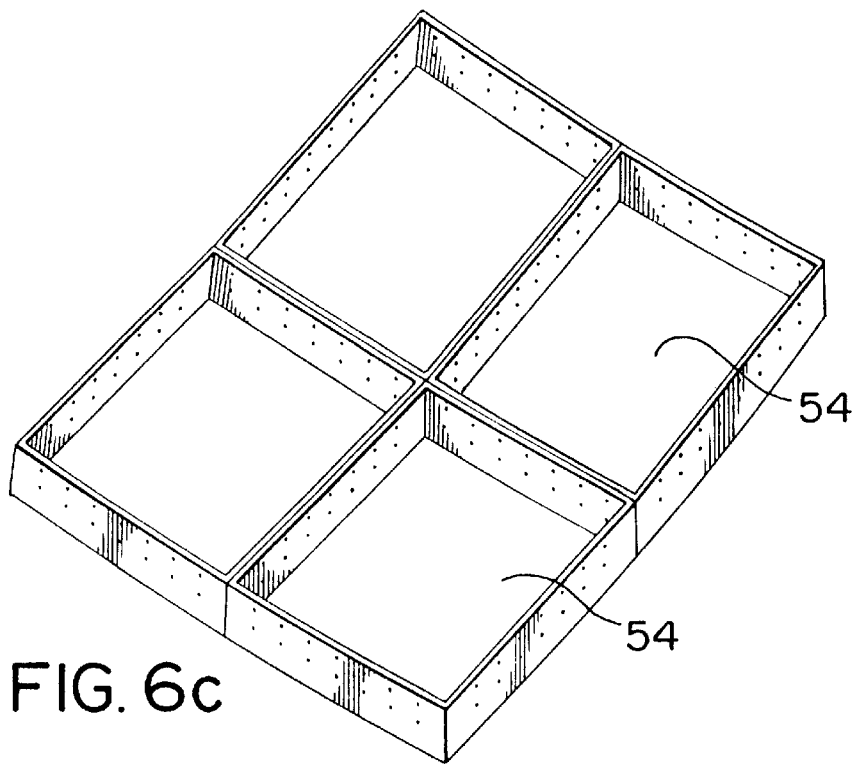
FIG. 6c is a perspective view of a clustered assembly of the box plate hull surface.
Figure 6D:
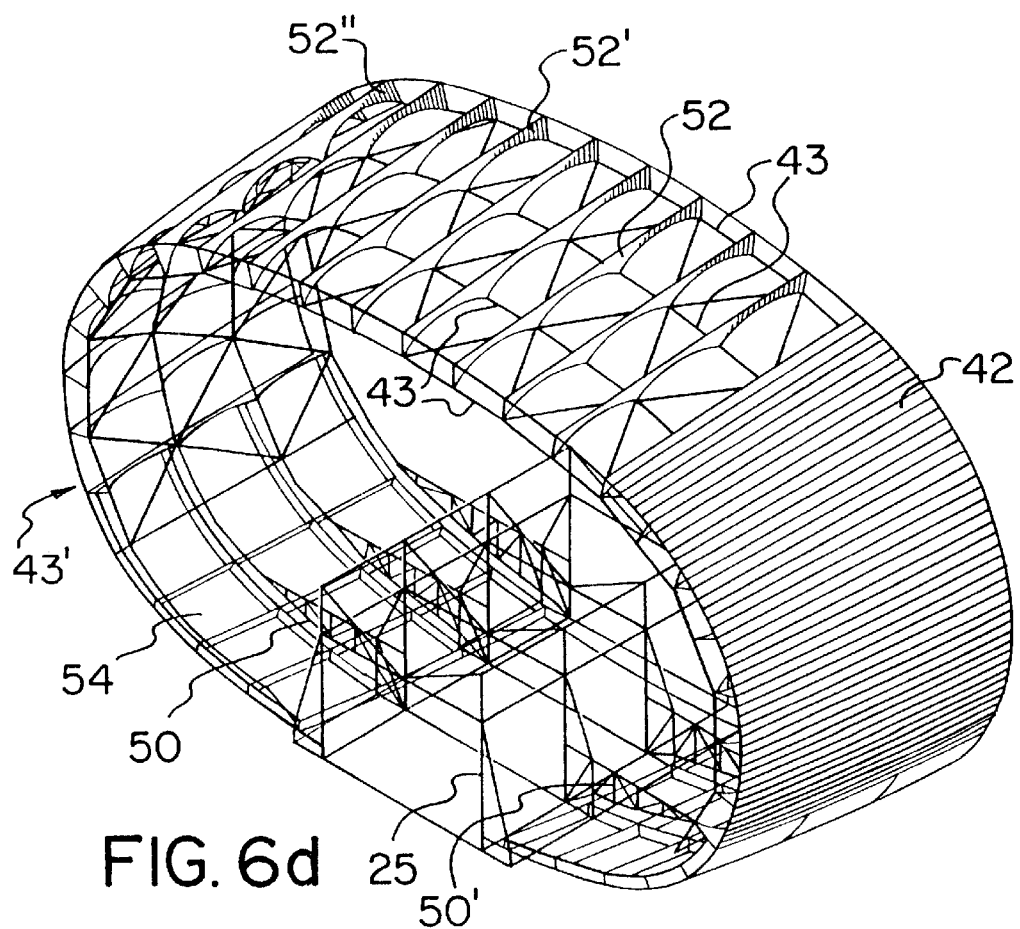
FIG. 6d is a perspective view of a typical stand alone bay and shows the keel, the shell space frame and the transverse ribs.

Referring to FIG. 6a and 6b, the hull of the present invention consists of a rigid self-supporting space frame shell 41 around which semi-flexibly attached a semi-rigid covering formed of panels 42, which is able to substantially maintain its overall surface geometry when under no internal pressure. A gap 53, of typically 0.5–0.75 m, is formed between the shell 41 and the panels 42. The shell 41 and the panels 42 act together with internal pressurization to form a lightweight, rigid pressure vessel providing significant increase (about 50–55%), over unpressurized vessels with the same mechanical structure, in resistance to bending moment and streamlining of the frame 41 to achieve a suitable aerodynamic hull surface shape. This mechanical approach has been termed a "Pressure Tensioned Shell Frame" (PTSF) fuselage by the inventor.

While internal pressurization is a known method in mechanical engineering to stiffen vessels and has been employed in space and aviation technology prior to the present invention, no suitable construction has been developed which is useful for large sized aircraft travelling at medium to high speeds. Generally, the shell 41 is a series of rings 43 in positioned orthogonally to the z-axis. Each ring 43 is formed, in the preferred embodiment as shown in FIG. 12a, of a plurality of tubes in the form of a polygon with 12 to 18 corner vertices 78 (18 vertice polygon rings are shown). Every second ring is rotated by 30° or correspondingly 20°, thus creating a frame cross section (in front view) having 24–36 rows of vertices 78. In alternate embodiment as shown in FIGS. 6a and 6b, the ring 43 vertices 78 are regularly spaced about the top and lateral portions of the cross section of the inner contour of the hull, while the lower sections of the rings 43' are modified to include a greater number of members to accommodate connection of structural ribs.

Each vertex 78 is aligned for each second ring along the z-axis of the hull curvature. The rings 43 and the interconnecting torsion beams 44, form a web of interlocking triangles connected by elevated nodal points 45, at the vertices, providing some amount of depth space to the shell structure.

Referring to FIGS. 7a, 7b and 8a to 8d, each node 45 has substantially the shape of a ring and has 6 bore holes which allow the insertion of bolts 45' which are fitted from the inside of the ring node 45 and are engaged in tapped counter holes formed in the end cones 43', 44' of members 43, 44. Each node 45, being a pin-type joint, acts to connect six tube members of the shell frame 41. Perpendicular to the plane of intersection of the ring tube members 43 with the node 45, preferably a latch mechanism 63 is inserted into a slot 62 formed across the top side of the node 45. The latch 63 is maintained in the slot by a pin bolt 46 and is part of a clamping device 60 which allows local clamping of a cable 58 and the tip or "toothed" portion of the rib 52 which is semi-rigid and which bridges the gap 53 between the inwardly located rigid space frame shell 41 and the semi-rigid outer covering of panels 42. The panels 42 take the shape of gores running from bow cap 57 to stem cap 57'. The cable guide/clamping device 60 is typically 0.65 m in length and 0.15 m in height and is formed of a clamp 60' which secures a pair of planar members 60". Planar members 60" are bonded to rib 52 and are engaged by clamp 60' during assembly.

To further understand the mechanics of the attachment of the outer covering panels 42, the construction and mechanical particularities of the outer cover panels 42, their connection to the longitudinal interface ribs 52 and their mechanical function will be explained.

The outer cover panels 42 are formed as a sandwich composite of lightweight layers. The preferred sandwich provides the best strength to weight ratio with currently available materials and consists of, from outwardly facing surface to inwardly facing surface: a very thin layer, for example 0.005 mm, of an abrasion resistant film (e.g. Tedlar R; a layer of a tri-axial woven fabric using poly-aramide fiber (a.g. Kevlar R; a honeycomb core sheet of about 10 to 15 mm thickness; another layer of the tri-axial woven fabric using poly-aramide fiber; and a final inner layer of an effective gas barrier film, such as metallized Mylar R, which is commercially available. The layers of the sandwich are bonded with an adhesive. The honeycomb sheet contributes enough "in-plane" stiffness to the sandwich to resist wobble and flutter stresses which are introduced into the outer surface during cruise at speeds of about 360 km/h. Such a panel construction has a weight of typically about 0.45–0.65 kg/m$^2$. The panel has an equivalent tear resistance of a 1.5 mm thick aluminum sheet with a fraction of the aluminum sheet's weight. The panel has several times the unit tension strengths of modem Blimp flexible structures.

Figure 8A:
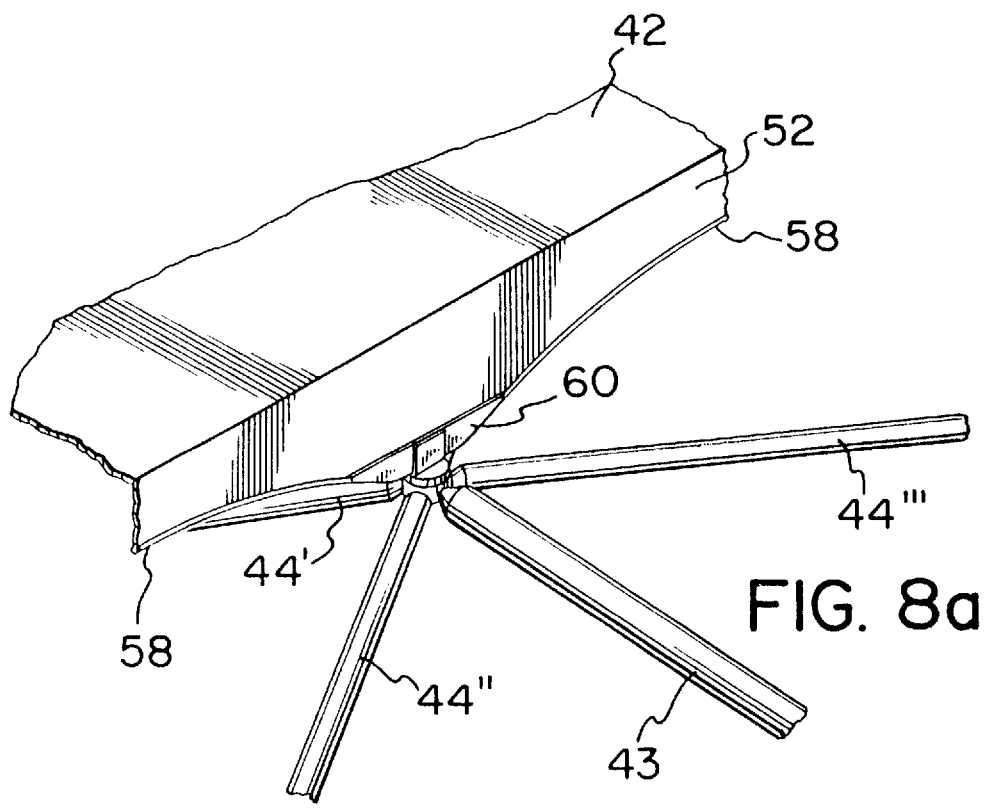
FIG. 8a is a perspective view of a shell frame nodal connection showing a rib section interfacing to the outer cover.
Figure 8B:
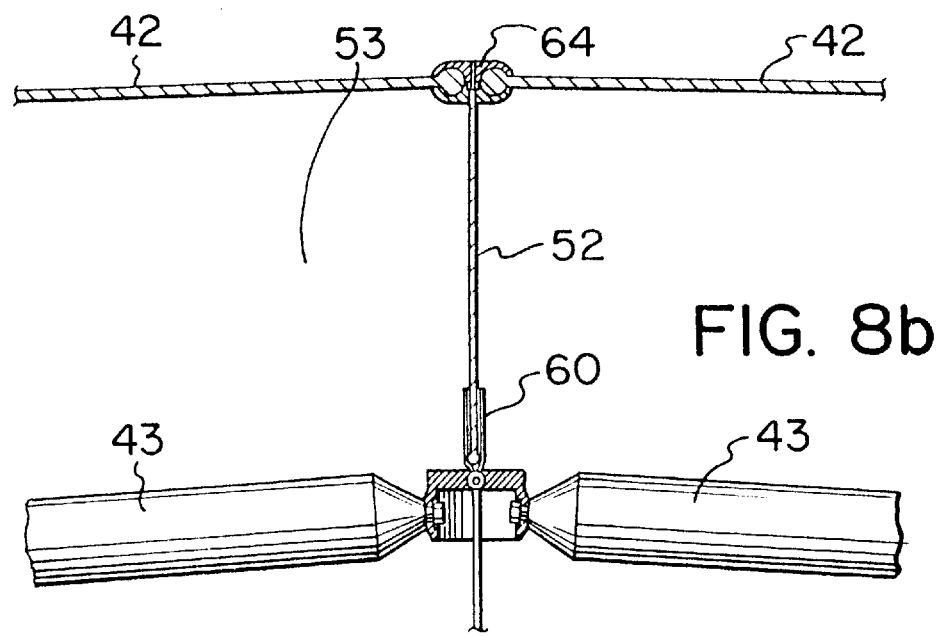
FIG. 8b is cross section view of a shell frame nodal connection with a rib section interfacing to the outer cover and outer cover panel connector element.
Figure 8E:
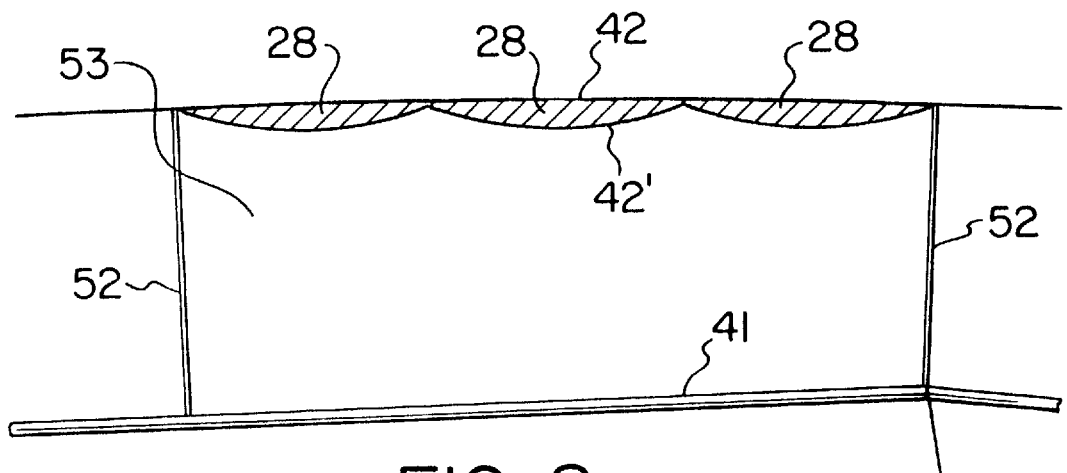
FIG. 8e shows a cross section of an alternate hull surface panel.
Figure 8F:
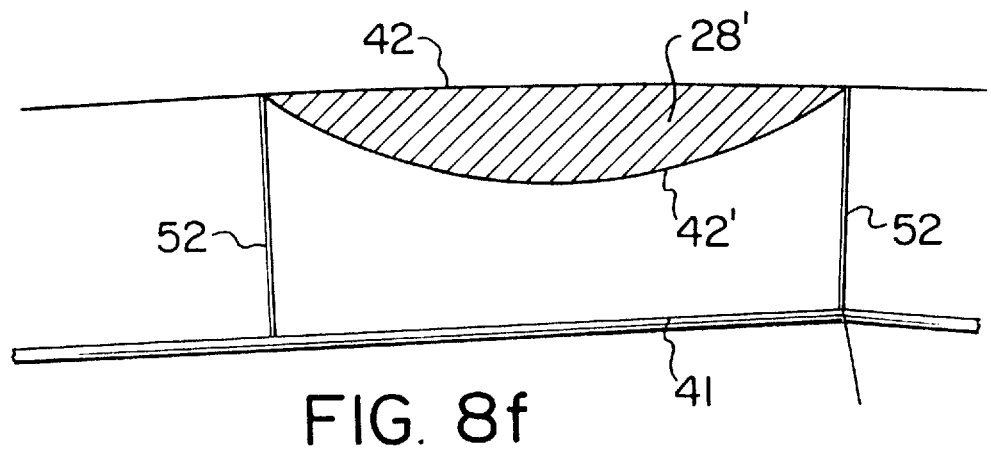
FIG. 8f shows cross section of an alternate hull surface panel with an integrated air duct.

In an alternate embodiment of the outer hull cover panels are formed of two sheets of flexible material with a sheet of low density honeycomb disposed therebetween. In another alternate embodiment, as shown in FIG. 8e, two thin sheets of flexible material 42, 42' are used to form an inner and an outer covering layer. Closed cell foam 28, having a low density of between about 15–30 kg/m$^3$, is placed between sheets 42, 42'. The space between the flexible sheets is inflated prior to injection of the foam and the sheets thereby act as a mold until the injected foam cures. Such an arrangement provides enough structural stiffness to maintain the cross sectional shape of the hull. In yet another embodiment, shown in FIG. 8f, the covering is formed by two spaced sheets 42, 42' of flexible, high-tensile material and the space 28' between the sheets is pressurized separately from the overall hull volume by independent means of pressurization. In this way, the higher internal pressure in the space acts to stiffen the outer cover locally without effecting the whole hull volume.

The sandwich composite, as described above, is the preferred material for use in the formation of panels 42. To assemble the covering on the hull, the sandwich material it is cut into repetitive panels 42' which follow the geometry defined by the sequence of vertices 78 along the perimeter of the shell 41. Referring to FIG. 8b, a interface seam of two adjacent panels 42 and a perpendicularly extending "toothed" rib 52 is shown. The "toothed" ribs have typically a height to span ratio of about 0.20:1 to 0.25:1 and can be produced from the same material as the panels 42 or other light weight sandwich materials. The construction method useful for interconnecting a rib 52 with the panels 42 makes use of integrated joining edge technology which has perfected the fabrication techniques of heat and ultrasonic welding and facilitates the joining of these separate parts. Referring to FIGS. 8b and 8d, the interconnection of two panels 42 with a rib 52 is accomplished by use of a connector 64 which is integrated to rib 52 and engages enlarged edges 42a of panels 42. Edges 42a of panels are enlarged by means of integrated edge technology. In particular, connector 64 is formed as an upper section 64a and a lower section 64b which are joined by a fastener 2, such as a screw. Lower section 64b is securely integrated to rib 52. Corresponding grooves 64a' and 64b' are formed in sections 64a, 64b, so that when joined, a channel is formed between sections 64a and 64b which is shaped to receive and firmly hold panel edge 42a. During assembly of the covering, edges 42a of panels 42 are placed in grooves 64b' and section 64a is placed over this arrangement so that edges 42a also fit within grooves 64a'. Fastener 2 is then inserted to firmly join the sections 64a and 64b. By use of connector 64, installation of the covering can be accomplished from outside of the hull. Preferably, connector 64 is formed in extended lengths by extrusion of poly-aramids, such as Kevlar R.

To connect the ribs 52 with the nodes 45 of the space shell 41, the tip portion of a "tooth" is bonded into clamping device 60. The latch 63 formed on device 60 fits the geometry and location of each of the node connector points 45 and slot 62. Cable 58, formed of Kevlar R, is incorporated along the edge of the rib 52. This cable 58 acts as the main tension member to transmit the outer hull surface tension forces, generated in part by the internal hull pressurization, into the cable guide/clamping device 60 which, in turn, conducts all concentrated tensile forces through the latch 63 into the node 45. The latch 63, after insertion into slot 62 of node 45, allows for some lateral rotational motion around pin bolt 46. This provides some lateral deflection flexibility for the semi-rigid rib 52 between the outer panels 42 and the rigid frame 41. The geometry of the latch 63 is determined by the amount of stresses the internal pressurization of the hull generates per unit area of the covering. Further clamping devices 60 can be attached along the ring members between nodes 45, as desired to further distribute the load into the frame. About 36 rib connecting points are installed along the upper portion of each ring 43.

The outer covering is formed by a complete set of panels 42, each longitudinal panel is formed of 12–24 gores. These panels can be installed from the hull top centerline down to the intersection of the lower shell 30. After the whole hull surface is completely enclosed by the upper hull covering formed of panels 42, lower shell 30, bow hull cap 57 and stem hull cap 57', the hull can be internally pressurized. Pressurization means are well known from blimps and air supported domes, and do not require further description. With a slight pressure bulk up over ambient pressure, for example of about 3–12 inches of WC (3000 Pascal) the outer cover panels 42 will be stretched tight. The hull geometries have been developed such that, under internal pressure, the hull enclosed gases (air and/or a lifting gas) effect a uniform perpendicular surface pressure throughout the inner hull and act to force the panels 42 radially outwardly. The in-plane surface tension load acting on each of the panels 42 is transferred into the ribs 52. This tension is consequently transferred through the cable guide/clamping device 60 to the latch 63 and into the node 45. This stresses the underlying shell frame structure members 43, 44. The arched shape of the ribs 52 between two adjacent nodes 45 allows distribution of the accumulated tension load between two rings 43.

Figure 7A:
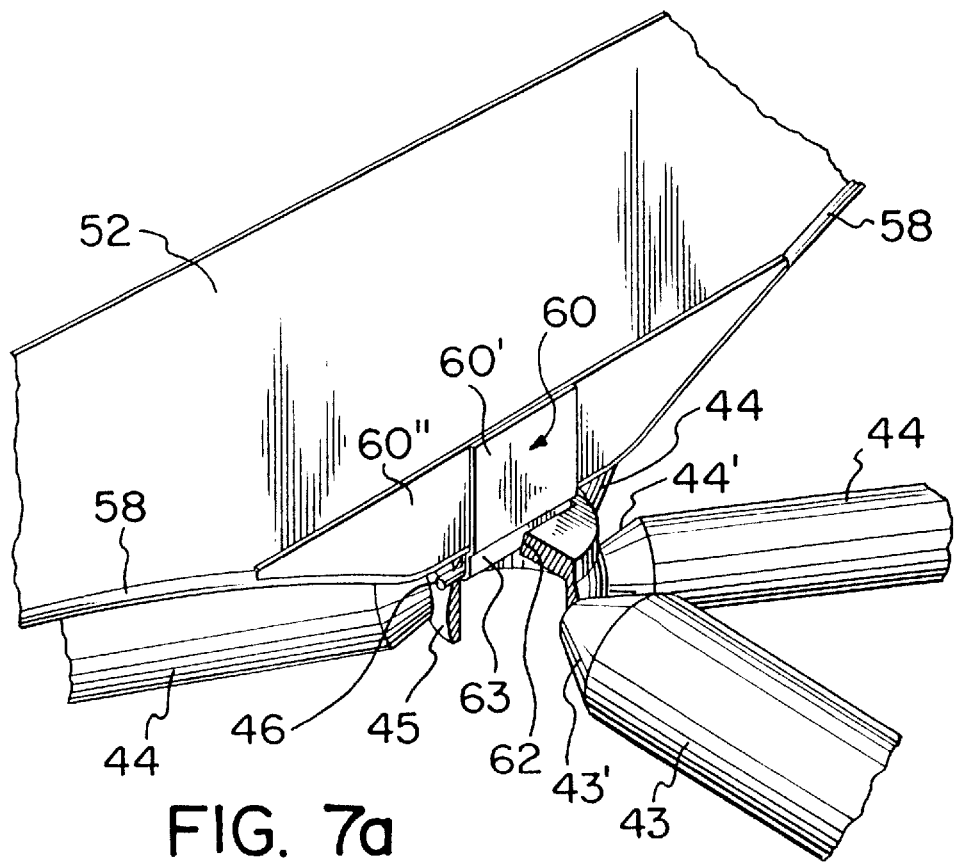
FIG. 7a is a perspective, sectional view through a frame node connector with a cable guide/clamping device and a plurality of space frame members.
Figure 7B:
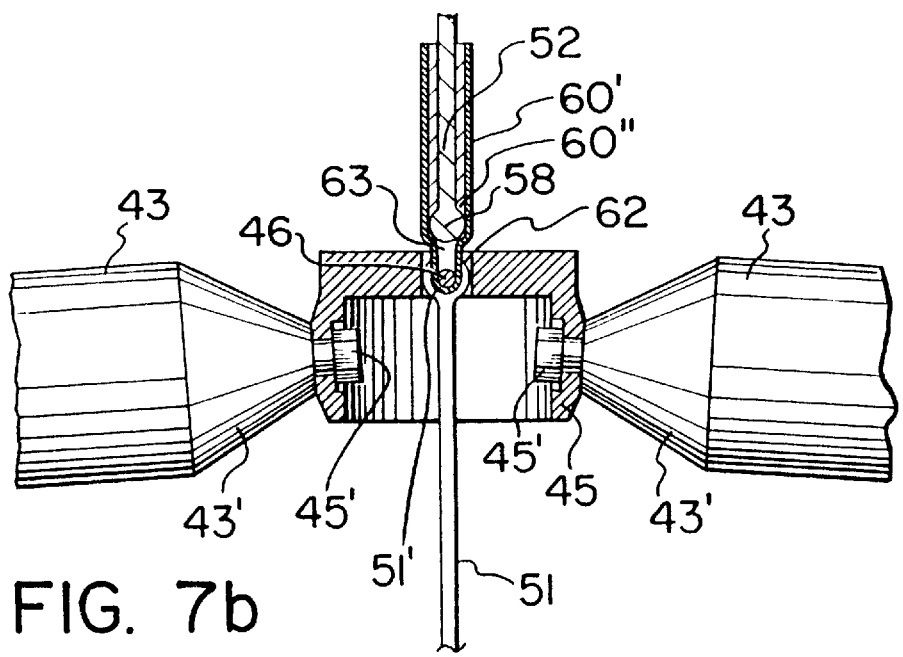
FIG. 7b is a cross-sectional view through a frame node connector with a cable guide/clamping device and plurality of space frame members.

Referring to FIGS. 6b and 7a, at least some of the space frame nodes 45 have rods 51 with cable eyes 51' formed thereon installed about their pin bolts 46. The rods 51 are free to assume the geometry driven angles to align with the keel 25. Thus, from the center point inside of the node 45, to the cable eye 51' of the end rod 51, a tension wire 47 runs to the upper right 25a and left 25b comer of the keel 25 at a location corresponding to the ring 43 position on which the node 45 is located. These arrays of cables 47, act to offset the hoop stresses created by the internal pressure and retained by the surface tension and also act to distribute some of the force created by a concentrated payload housed in lower cabin 13 and upper cabin 14 through the keel structure 25 and into the shell 41. Additionally, the tension wires 47 act to render the shell frame structure 41 stable without internal pressure present.

Application of detailed engineering, including finite element techniques and vertical gust simulation of the forces the aircraft hull is subjected to in cruise flight, have quantified that the combination of above-described covering panels 42, ribs 52, and the shell members 43, 44, 45 substantially all remain pre-stressed due to the presence of internal pressurization over a wide range of operational speeds, for example up to about 360 km/h cruise speed. Only when vertical gusts, particularly gust having speeds beyond 60 feet/second, are encountered at such speeds, some of the members connected to the keel go into compression. The characteristic tensioned nature of the elements of the shell 41 during typical cruise speeds, shows the superior weight to strength ratio of hull. As known, components made from materials such as Kevlar R and carbon graphite, carry many more times the load of a force applied in tension, than that applied in compression. Averaged surface assembly unit weights of typically 2.2–2.5 kg per m sq. (at defined load conditions) are in this way achievable with the described construction method. Which consequently will result in a lightweight airframe structure having favorable empty weight fractions of typically 0.45 to 0.5 at a 40 ton maximum take off weight aircraft size. In the event the pressurization fails, the local buckling strength of the space frame members 43, 44, which have typically 8–12 cm beam diameter and 0.5–2 mm wall thickness when aircraft aluminum alloys are used, is defined such that the full structural and shape integrity of the lifting body hull can be maintained at a lower cruise speeds of 110–125 knots with a 60 feet/sec vertical gust moment. This will allow the aircraft to return to base even in adverse weather conditions.

Load Bearing Integrated Outrigger with Tilt-Able Wing Section

Figure 12C:
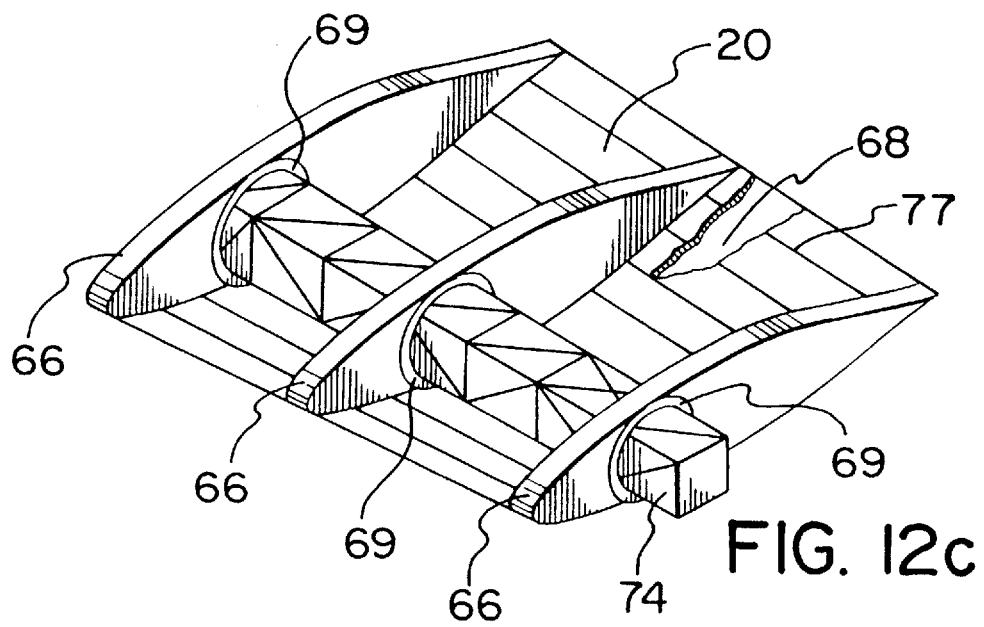
FIG. 12c is a perspective view of an external outrigger and a pivotal wing section.

Referring to FIGS. 12a to 12c, due to the fact that the vertical static lift component in a smaller "Hybrid Aircraft" plays no, or, only a minor role in the balance of lift forces in VTOL, a very significant amount of force (typically 10–20 ton) and vibrations are acting an the outriggers 74.

The design of such outriggers 74 should be sufficiently stiff to withstand the forces and yet be relatively lightweight.

The hull internal carry-through beams 26 (only one shown) are preferably of conventional modular truss construction or a large diameter tube. Beam 26 is closely integrated to the keel 25 and frame 41 by a series of tension cables 73 connect the beams 26, 26' to the shell 41 while rigid tube elements 72 connect the keel 25 to beams 26, 26' to provide a well supported beam 26. The ends 71 of beam 26 directly interface with shell structure 41 and create a very stiff local web of beams suitable to act as a "hard-point" 76 at which the outriggers 74b, 74c are supported. Some of the beam members in web 76 allow tangential distribution of moments into the space shell hull structure members 43, 44 which are particularly suited to absorb forces acting "in plane". The hard point 76 provides enough stiffness against bending moment in its vertical, as well as, its horizontal planes to withstand the rotor thrust forces which will act in both direction at this point.

The external outriggers 74 can be a square truss, as shown, or a tube. Outrigger 74 is limited in maximum height and width to the inner maximum chord height geometry of the wing sections 20 airfoil type. A typical outrigger 74 has a diameter of 0.8 m to 1.8 m. The specific diameter is selected with reference to size of wing section 20, thrust required and propeller sizes.

Because each wing section 20 can be rotated differentially from the propeller axis, but is often tilted at about the same angle as the propeller axis itself, the thrust forces acting on the tip of this outrigger 74, and its resulting bending moments, are very much in line with the position of the wing section. They can deviate in VTOL hover and S-STOL flight mode usually to a maximum angle of about 18°–22°. Thus, the force vector introduced into the outrigger, is the same as the thrust vector which is the largest load acting on this structure. The wing section is preferably made an integral part of this arrangement. The wing section, when approximately aligned with the thrust axis, provides a much higher moment of inertia in the plane of its chord length, than the outrigger beam itself.

The wing section 20 is designed as a stiff wing box with stiffened ribs 86, panels 77 extending between ribs 77 and composite sandwich surface covering 68. The wing section has a high cross sectional moment of inertia along its length. Both the moment of inertia for the outrigger 74 and the moment of inertia for the wing section 20 are summed for that position in whatever angle the wing section is rotated to at a given moment. This significantly increases stiffness results for a given structural weight. The combination of wing 20 and outrigger 74 these components add to each other their individual maximum bending moment strength capability, when compared to acting alone to support a corresponding load. The wing ribs 66 installed bearings are surface type bearings 69 optimized to sustain torsion loading. Bearings 69 can be produced from composites, to reduce weight, or can be made from classical roller bearing materials, such as steel.

With this outrigger and wing geometry, in VTOL flight mode, when the wing sections 20 are in vertical position, to also act under certain conditions as control moment generators, adequate outrigger striffness is assured. Likewise, in forward flight, when the wing sections act as a conventional airfoil to produce dynamic lift, sufficient outrigger stiffness is available to alternatively accommodate both thrust and dynamic lift forces acting on the wing sections 20 and thus the outrigger, depending on flight mode and dynamic lift load distribution.

Integrated Cruise, VTOL Propulsion and Hover Flight Thrust Control System

The aircraft of the present invention is configured to deliver precision hover and good station keeping ability in 80% of all prevailing wind speeds. Control system hardware and software means are provided to supply a propulsion and force vector controlling in combination, which can deliver thrust vector changes rapidly to achieve attitude control. Smaller vector changes can be delivered in a fraction of a second, while larger vector changes can be delivered within about 0.5–1.5 seconds.

Commercially available, large diameter tiltable proprotors are usually limited to tilt rates of typically 0.7°–1.5° per second, to avoid excessive stresses induced through the inertia of gyroscopic forces. When considering the effect of sharp edge gusts or wind direction changes, which can occur in about 0.5–1 seconds, it becomes clear that the tilting of props 24 alone cannot provide the yaw moments required, to maintain the hull in the pre-turbulence position in such conditions. This is particularly, when it is desired to match closely a target over the ground during hover.

Figure 9B:
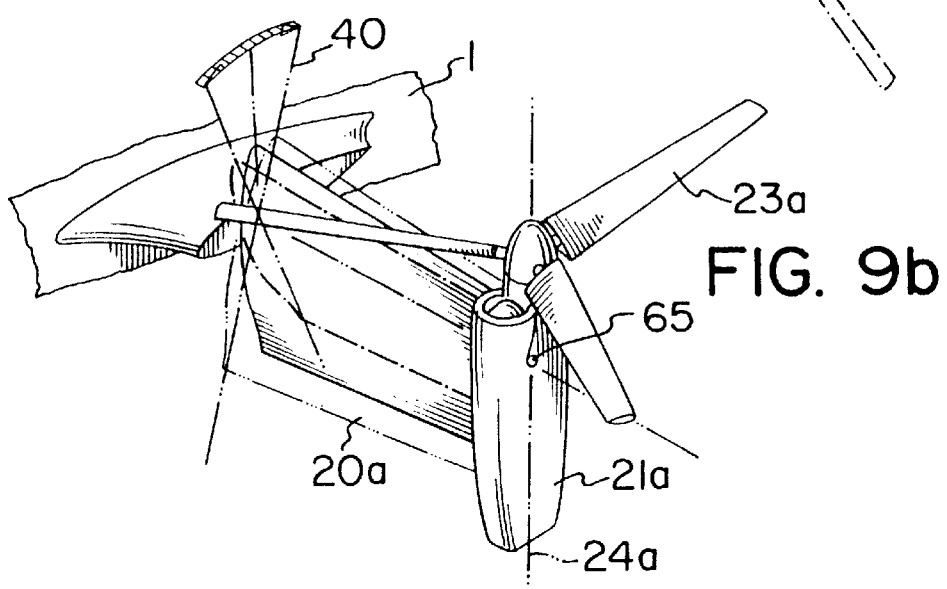
FIG. 9b is a perspective view showing the independent wing section vertical tilt capability and differential vertical tilt range.

Here the pivotal installation of the wing sections have their supplementary function; allowing rapid rotation around their neutral axis with rotational speeds of up to 22°/second. Referring to FIGS. 1, 9a and 9b, at the onset of the rotation in "y-axis" of the aircraft, an onboard computer-based sensing system measures the rate of acceleration and determines the forces required to arrest, or, to slow down this adverse rotation. Within about 0.2 second about 6–7% of the thrust produced by the propellers 23a, 23b, 23c, 23d is available as yaw moment, by the combination of positive and negative lifting forces acting almost perpendicular on the tilted wing sections 20a, 20b, 20c, 20d which are pivoted up to 22° forward, or respectively backward, from a vertical position, in opposite directions on the left and right side of the aircraft.

This immediate activation of yaw moment will either prevent the start of a rotation in the y-axis in perturbations up to about 20 knots, and/or significantly slow down the rotational speed in this axis, until the slower pivoting propellers have reached a pivot angle of 2°–3° from vertical in about 1.5–2 seconds, again tilting differentially forward and backward on each side of the hull, after the onset of the perturbing wave front, gust or wind shift has collided with the aircraft. Application of the standard cosine function of the rotor tilt angle, which determines the horizontal thrust vector available in x-axis in a vertical acting thruster for a given amount of vertical thrust available, shows the following picture: at 3° prop-rotor tilt, additionally to the vectors already created by the immediate wing sections tilt, 5.2% of vertical thrust vector is available. The percentage of each of the two control vector producing sub-systems 20a, 20b, 20c, 20d and 23a, 23b, 23c, 23d added, is sufficient to create strong combined yaw moments. It is known from control of modem helicopters, that typically 10–12% of overall thrust has to be reserved to assure good controllability. Similar figures, for example, about 7% from wing sections plus 5% from rotors, are achievable in the "Hybrid Aircraft", as demonstrated. Also, it has to be kept in mind that, in the design case of a typically commercial "HA" having a wing span of about 35–40 m, the available thrust vector is applied at the end of a very long moment arm of up to 20 m long. This delivers very powerful control moments, to rotate the aircraft back into alignment with the main wind direction.

When the prop-rotors 23a, 23b, 23c, 23d have differential tilt angles fore and aft of $\geq 3°$ from vertical, up to 5% of vertical thrust component can be made available to produce moments in "yaw" by the prop tilt alone. With larger prop tilt angles from vertical, the wing sections 20a, 20b, 20c, 20d continue to produce the moments as determined before, as they can be rotated parallel with the increasing rotation of the prop-rotor axis. The relative downwash vector over the wing sections remains unchanged. For a typical commercial sized "HA"having about 40,000 kp of thrust, in combined wing and thrust axis tilt, more than 225,000 meter-kg control moment in "y-axis" is available, which corresponds to the perturbation moments of winds gusting up to about 54 kts (28 m/sec, or, 93 ft per second) acting on the hull. This is close to the highest gust speed in which modem aircraft are designed to safely fly. This is also equal to the best precision hover performance of modem helicopters, and sufficient to assure a 85% "on station time" typically desirable for commercial operations.

Flight Control Modes and Related Control Elements

Table 1 shows the systematic symmetric "hair" and "differential" combinations and variations of magnitudes of propeller thrust vectors, rotor axis vectors and the wing section negative and positive dynamic fit vectors for the two main flight modes to be controlled: Hover and Cruise flight. A description of components involved in the relevant attitude control requirements follows Table 1.

Figure 9C:
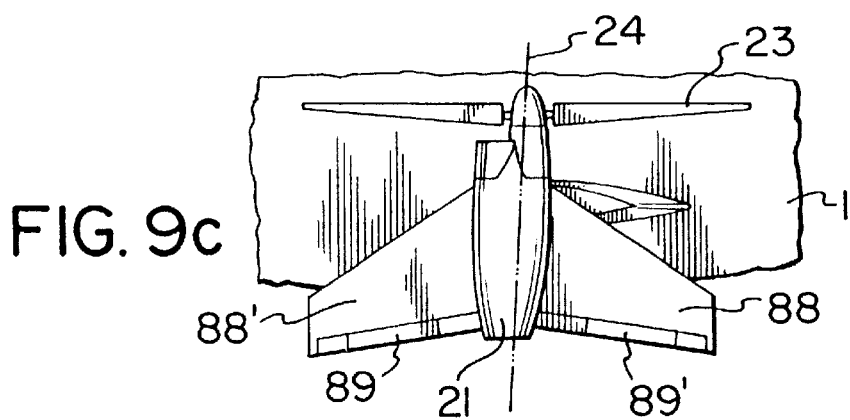
FIG. 9c is a side elevational view showing an alternate propeller arrangement having a stabilizer attached to the engine nacelle.

Table 1 presents the elements involved in flight attitude control in a table form.

another embodiment, vertical stabilizers 88, 88' (FIG. 9c) are mounted onto the engine nacelles 21. When prop axis 24 is in vertical position, the rudder integrated tabs 89,89' on the stabilizers 88, 88' collectively lift or right, to cause deflection of the propeller slipstream and thus translational movement in "x" axis without roll angle.

R-VTOL or S-STOL Flight Modes

In S-STOL the four propellers are tilted to a position of about 70°–75° from horizontal to maintain an advantageous ground air cushion effect and to optimize lift and forward acceleration vectors. The four wing sections are tilted collectively to about a 15° higher tilt angle than their corresponding propeller axis. This provides very effective acting "blown" control surfaces, over which the air stream of the propeller is accelerated and thus the wing sections can provide pitch and roll control moment in the S-STOL situation, even at very low flight speeds between 80 and 110 km/h (45–60 kts), when aerodynamics control surfaces typically are lacking effectiveness, due to missing air pressures almost not acting on them in very low speeds. Directional control, (yaw-control) is provided by differential thrust between right and left propellers.

In an optional embodiment, vertical stabilizers 88, 88' (FIG. 9c) having rudders 89, 89' can be used to provide a blown rudder arrangement. This embodiment would provide directional (yaw) control as known in conventional aircraft designs. This stabilizer-rudder configuration is considered feasible, but not the preferred embodiment for structural

TABLE 1

| | HOVER FLIGHT | | | | | | CRUISE FLIGHT | | | | |
| --- | --- | --- | --- | --- | --- | --- | --- | --- | --- | --- | --- |
| | Roll | Pitch | Yaw | Trnsl.z | Trnsl.x | Altit. | Roll | Pitch | Yaw | Vel. | Altit. |
| Prop. Pitch Change | x | x | | | $x^n$ | x | | x | x | | |
| Propeller Tilt | | | x | x | | | | | | | |
| Rotation Wing Section | | | x | x | | | x | x | x | | x |
| Different. left - right | x | | x | | x | | x | | x | | |
| Different. fore - aft | | x | | | | | x | | | | x |
| Rudder Deflection | | | | | x | | | | | | |

VTOL Flight mode and hover

The attitude control, pitch, roll moment generation in z, and x axis is accomplished through differential collective thrust changes of rotors side-to-side and fore-to-aft. Main yaw moment for rotation around the "y-axis" is generated through tilt of the right side props backward to maximum or 10° (from vertical) and the tilt of left side propellers by the same degree forward. Yaw moment in hover control involves additionally the wing sections as described in detail above. Forward translational slow speed mode is achieved through collective tilt, of all four props forward, typically 2°–5°. Translational motion backwards, likewise, is achieved through collective tilt of all four props or all four wing section backwards. In case of backwards motion the propeller tilt is preferably limited to a maximum angle of 10° backward.

Translational movement sideways is achieved by introducing first a roll moment with differential thrust between right and left rotors and then keeping collectively thrust in the same proportion. Other solutions would be added cyclic in lateral for one axis only or installation of other means, such as fan thrusters (not shown) in the bow and stem caps perpendicular to the center line of the hull, in this way providing translational sideways movement without roll. In reasons and reasons of applying a preferred advanced computer controlled stability enhancement design approach.
Transition flight mode (from VTOL and Hover only):
Starting from a VTOL, or hover flight mode with the prop axis at about 90° from horizontal, the thrust vector can be rotated by slowly tilting the four propellers collectively forward. The x-axis forward component of this vector accelerates the aircraft forward. This results in increasing forward speed and in the generation of dynamic lift by the lifting body hull and the four wing sections. This starts to reduce the magnitude of thrust lift required and permits further downward tilt towards horizontal of the propeller axis. During the tilting process, the effectiveness of axis bound generation of control vector changes. These are, however, governed by basic laws of geometry. Full transition is reached typically at speeds ≧165 km/h (90 kts).
Cruise Flight mode:
In cruise flight pitch control is provided by differential tilt of one pair of wing sections, for example, the left and right wing sections closest to the bow, fore and the other pair aft. Roll control and coordinated turns can be effected by differential tilt of the wing sections on each side of the hull and by differential thrust of right and left side propellers. Trim in cruise flight is achieved by differential fuel tank filling of fuel tanks fore and aft of the center of gravity. (Not shown). Directional stability is provided through differential thrust variations of right and left propellers pairs and, in an alternate embodiment, can be assisted by deflection of stabilizer 88 mounted rudder tabs 89.

Basic Flight Control and Guidance Concept

Figure 10:
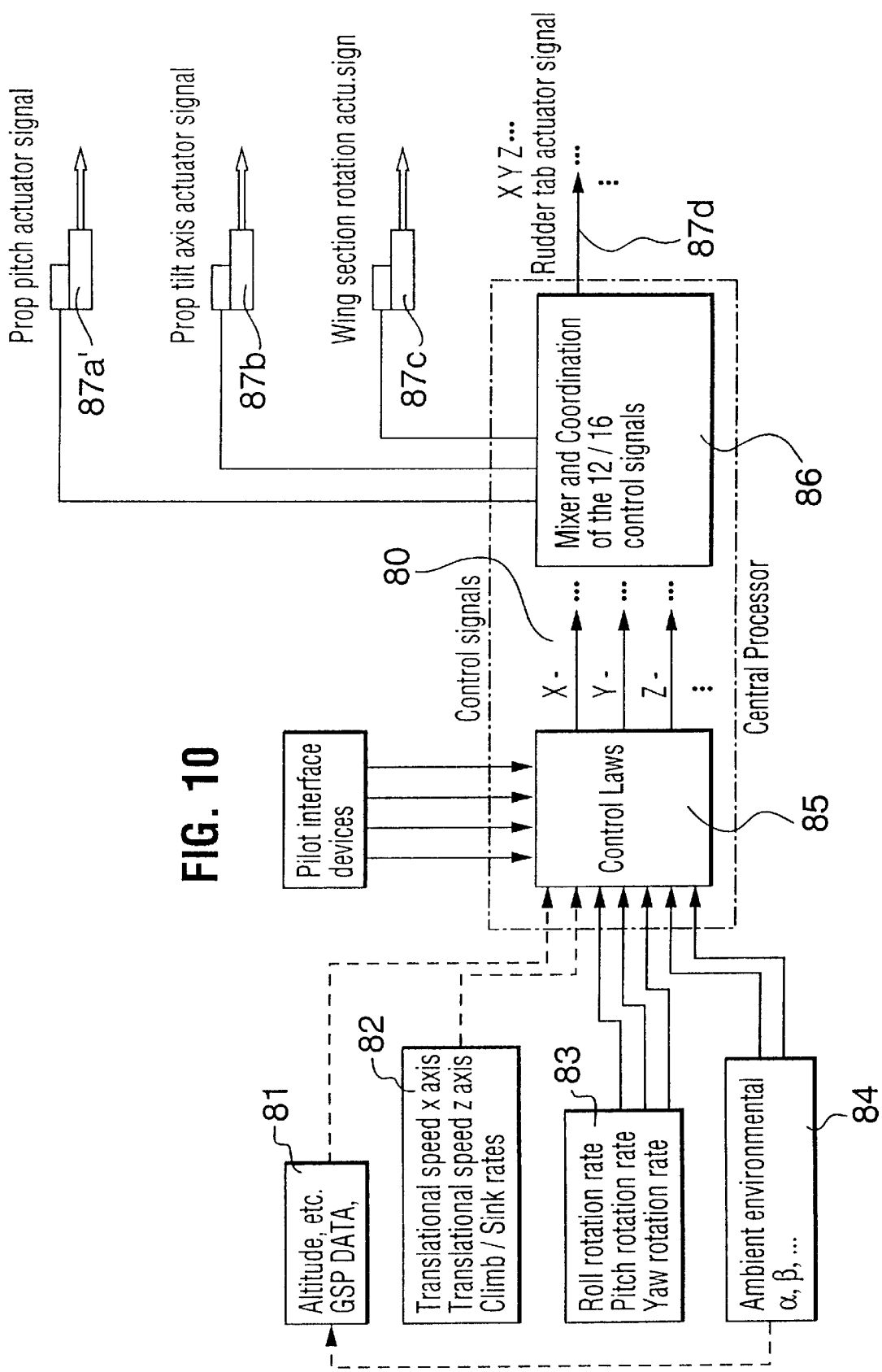
FIG. 10 is a block diagram showing the main elements of the flight control system.

The aircraft control concept is built around a concept known as Active Computer Augmented Stability concept. FIG. 10 shows a block diagram of the main flight control system components of the hardware layout described above. The basic control concept includes the control elements, as follows:

Control means:
- 4×variation of prop blade pitch, thrust regulation
- 4×variation of propeller tilt axis
- 4×variation of tilt angle of wing sections
- 4×variation of rudders mounted in prop slip steam (optional)

Control means available to pilot:
- 1 control stick for roll and pitch control and to facilitate control in VROL hover for transitional side movement and local translation fore and aft
- 1 button mounted on stick for collective prop axis tilt
- 1 button for collective thrust change
- 1 pedal for directional control Mixers:
- the 5 input variables of the pilot(s) have to converted into control actuator control signal size, to be specified for each of the 12 or 16 means of control available.

Actuators:
- due to the relatively slow cycle times of the aircraft, actuators activated by electrical motors are sufficient. This will allow the omission of a hydraulics, a major contributor to maintenance burden in any aircraft

Cockpit and Flight Control System Layout

Referring to FIG. 2, the cockpit 17 is installed in the front portion of the bow hull cap 57 of the hull 1. The cockpit layout and pilot interfaces may be any suitable arrangement such as that arrangement recently developed by Boeing-Bell Helicopter in the realization of the V-22 Osprey.

Referring to FIG. 10, the 12 or 16 elements listed above are controlled by electric actuators and configured with dual redundancy. The interaction of all elements controlled is coordinated by a computer 80. The system approach is typically based on state-of-art Fly-by-wire or Fly-by-Light control concepts. The computer 80 to which all components of the Fly-By-Wire system are linked, is housed in the cockpit.

The central core of the system is a three-axis laser gyro 83 for measuring the rotation angles in the x, y, z axis, which is linked to the computer 80 which monitors continuously the attitude changes of the aircraft. Auto-pilot functions are installed with typical automatic pilot capability for engagement by the pilot, if desired. The auto-pilot functions are preprogrammed to automatically handle certain recurring flight modes which arise as part of the various operational routine requirements. Further, the control system, is essentially based on "Rate Change Control" (RCC) principles, whereby the laser gyro 83 supplies the data regarding the rate of changes of relative movement in the x, y, z spatial coordinate system. The pilot, via a control stick and the other interface means, can set the desired values for rates of change in regards to various control parameters of the aircraft to be modified and/or maintained at any given time. The "control laws" computer program subroutines 85 deal with the preprogrammed equations describing the motion of the aircraft and provide data to the mixer 86, which will provide discrete signals 87a, 87b, 87c, 87d to a combination of actuators to achieve the flight control desired.

Onboard optical sensor 82 is preferably included in the flight control system to provide data to the computer concerning the translational movement of the aircraft in close ground proximity. Sensors 84 are conventional and provide data to the computer 80 concerning the prevailing atmospheric conditions.

Modem "steady state" laser-based gyro technology also monitors the continuous moving reference point, for example the actual location of the aircraft at any given point in time or the latest progression of position of the aircraft in its flight path. Alternately, an onboard Global positioning system 81 can provide information on the real time position of the aircraft. This sophisticated control technology is recently available at moderate commercial systems costs, and is currently available in "steady-state" hardware versions, having high reliability and requiring little maintenance, compared to earlier models using a combination of rotating mechanical and electrical parts.

FIG. 10 is shows a superior flight control system without application of mechanical means of linkage. The above mentioned Fly-by-light is the same system approach as the fly-by-wire system. However, the fly-by-light uses optical fibers to transmit the data from the central control processors to the local processors and actuators. This is an advantage for an aircraft of significant physical size and which, from time to time, may fly close to strong magnetic fields, for example in the inspection of high voltage power lines.

The control system is fully digital and has a layout of triple, or quadruple redundancy. Such a system could have also have an advanced "teaming mode", which would enable the computer system to "learn" and "save" certain responses to gust, ground effect, turbulence, etc.

To support ease of flight operations, particularly in minimum ground infrastructure support environments, load cells are in installed in the landing gears. These load cells provide automatic updates of the center of gravity shifts due to the rapid changing loading and unloading situations of the aircraft. These data will assure safe and flexible changing of payloads with a minimum of supervision by the crew or a "load master".

The drive systems

Two drive systems are preferred for use in the present aircraft. The first drive system includes conventional main drive train components. They include a conventional gas shaft turbine and auxiliaries, a gear box, a clutch and components for required "simplex" cross shafting for each pair of propellers front and aft. The shafting 19, 19' (FIG. 3) allows transmission of about 50% of the propulsive power from any of the two paired fore and aft engines, over to the opposite located propeller in case of engine failure at that unit. The shaft 19, 19' can be supported by the carry through structures 26, 26'. These installations are quite conventional and require no further description.

The second preferred drive system is termed a Turbo Electric Drive System (TEDS). Over the past 10 years, very significant progress has been made in light weight electric engine and new drive technology. Permanent magnet brushless motors and high speed power generator technology combined with semi conductors (thyristors), used for manipulation of high voltages and currents has evolved significantly in capability and seen drastic reduction in cost. In contrast to conventional electric motors, these drive units are capable of running at high rpm of between about 10,000 and 40,000. The weight algorithms for the turbo-electric drive outputs have reached the 0.2–0.25 kg/kW range per shaft power for electric motors and a level about 0.10–0.15 kg/kW for alternator output power in the ≧1000 kW range. While TEDS systems are known, the utilization of such system as primary drive systems for aircraft has not previously been realized. For a number of compelling engineering and operational reasons, such an turbo-electric drive system (TEDS) approach is useful as an alternate system approach for a "Hybrid Aircraft" of the present invention.

Figure 11:
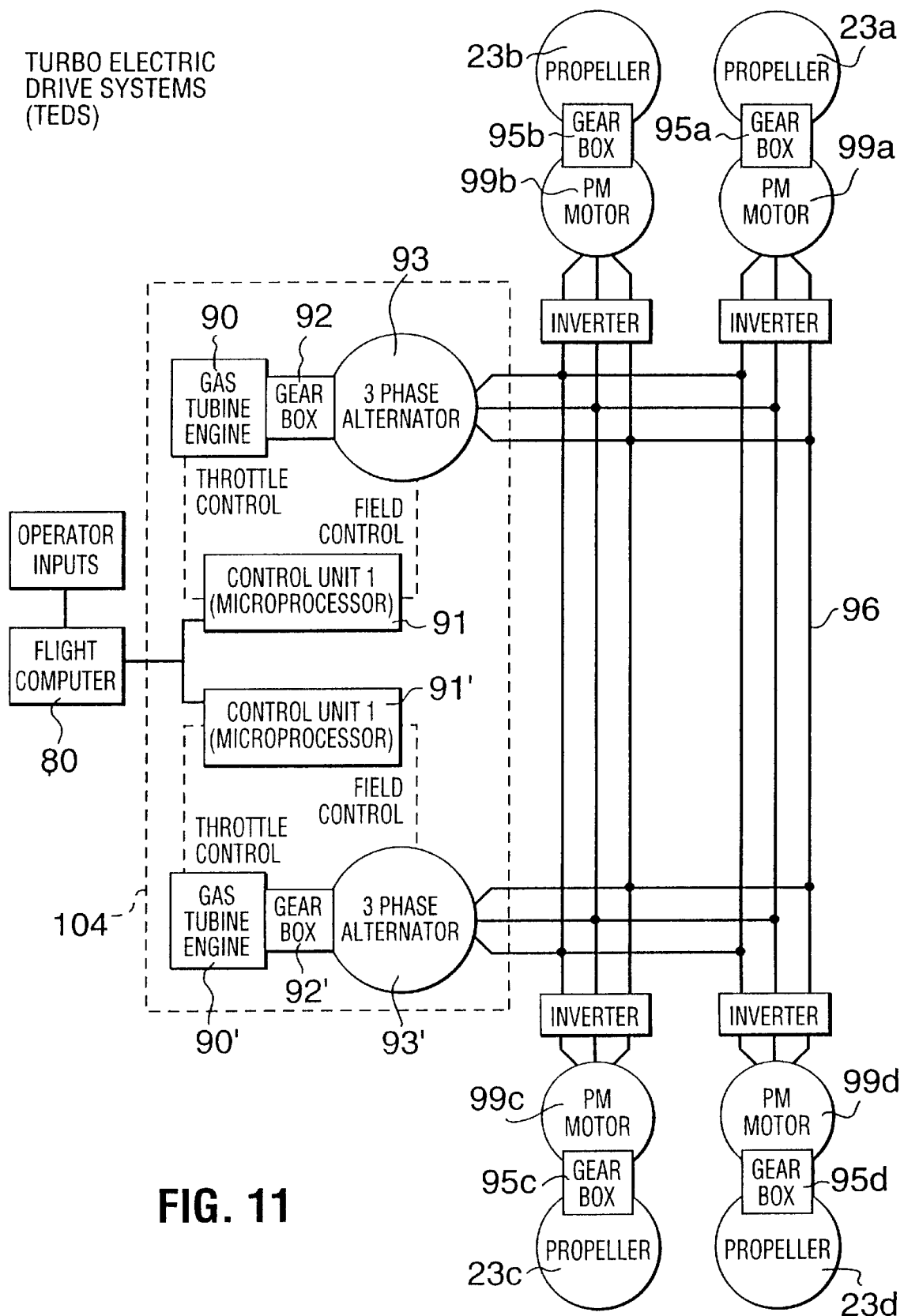
FIG. 11 is a block diagram showing the system circuit for Turbo Electric Drive System (TEDS)

The TEDS layout is shown in a basic block diagram in FIG. 11. The system includes conventional (aircraft certified) gas turbine 90, 90' in redundant layout, high speed, high density alternators 93 in redundant layout which are each directly coupled through gear boxes 92, 92', which optimize alternator rpm, to electric power conditioning and control units 91, 91'. A high voltage power transmission system 96 in redundant layout transmits power to four brushless permanent magnet motors 99a, 99b, 99c, 99d and gear boxes 95a, 95b, 95c, 95d to drive the constant rpm variable pitch propellers 23a, 23b, 23c, 23d. This system preferably has electronic fuel injection governors controlled by the central flight computer 80. The gas turbine engines 90, 90' and alternators 93, 93' are preferably housed in an engine room 104 suitably located in the stern of the "HA". The engine room is preferably positioned within the hull to be accessible from within the hull during flight to allow for in-flight repairs and modifications.

The shaft gas turbine 90 is the prime drive for the high speed alternator 93. This constant speed drive, configured as a direct shaft coupled alternator, can run at ≧10,000 rpm.

The electric power conditioning and control units 91, 91' include circuits containing a set of high performance thyristors and condition and manipulate the currents, wave forms and outputs instantaneously. It is controlled by a computer which receives, in turn, control signals from the flight guidance computer 80. The control signals have to be delivered to the various actuators to enact the power settings, etc., as a response to the pilot inputs.

At the power user level, the alternators 93, 93' supply energy, modulated by units 91, 91', to the four the brushless permanent magnet motors 99a, 99b, 99c, 99d. The drive shafts of these motors rotate at between about 10,000–12,000 rpm. The motor rpm is geared down by conventional two-stage gear boxes 95a, 95b, 95c, 95d to match the propeller tip speed of an optimized propellers size. High voltage power supply lines 96 run from the engine mom 104 to the four motors, The drive motor windings can be arranged in two separate segments and in such a manner as to have a built in 50% power redundancy, in case of failure of one of the windings.

The propellers are of the constant speed (rpm) type. In order to maintain the propeller speed constant, when varying lift/control require that the blade pitch be changed to provide more or less thrust, the electronic fuel governor injects an amount of fuel into the turbine which corresponds to the load condition signal produced by the flight computer. Systems having constant rpm prop with electronic fuel governor are very well established technology.

The hull internal power plant makes features of lifting gas heating or the air within the hull possible. The location of the gas turbines inside the hull and their position in such a way that some of the waste heat generated by them, can be extracted before the exhaust gases leave the stem of the aircraft, makes a combination with stem mounted heat exchangers mechanically practical enough, to have much easier installation of "super-heating" techniques compared to the conventional layout, in which waste heat has to be ducted from the exterior location of the turbine to heat exchangers located in the hull. The more practically feasible installations of heat exchange means and simpler ducting enhances the possibilities of heating the hull internal gas, thus to improve VTOL lift, if desirable.

Alternate HA Embodiment Having VTOL Serial Lift Fans with Integrated Stern Propulsion System An alternate embodiment of the aircraft of the present invention is shown in FIGS. 13a–13d. This aircraft is termed the Advanced Hybrid Aircraft ("AHA"Ship). This embodiment has a variation in the arrangement of propulsion and control elements from those discussed earlier herein.

The overall hull of the "AHA" is configured as a lifting body hull of small to medium aspect ratio, for example AR=1–3, and finesse ratios of for example, between 1:4–1:6 with a symmetric body for ground effect optimization. The hull can accommodate a lifting gas to providing up to 15% of its maximum take off weight by static lift, if desired. Its overall design considerations follow the main principles presented above for the preferred "quad-rotor" embodiment.

The lifting body hull 105 has a plurality of pivotal stub wing sections 106a, 106b, 106c, 106d mounted thereon in tandem arrangement, fore and aft of the center of gravity 124. Wings 106a–d provide pitch control and coordinated turns in cruise and low speed. At the end of the stub wings 106a, 106b, 106c 106d, vertical stabilizers 115a, 115b, 115c, 115d with integrated rudder tabs 116a, 116b, 116c, 116d are mounted to facilitate directional control in cruise flight The stub wing sections are pivotally mounted at their neutral aerodynamic pressure points and can be rotated from 0° (horizontal) to 25°.

Along the maximum diameter middle portion of the hull in plan view, a plurality of fans 108a–108g and 108a'–108g" are mounted. Typically 2–4 fan units are mounted fore and aft and left and right from the center of gravity 124. The fans are installed in horizontal flanges 107 and 107' which extend from the maximum perimeter of the hull 105. The fans are preferably those commonly used in the first fan stage of high-bypass-ratio gas turbines, for example those commercially available from General Electric Company. They are typically deployed in current large size passenger jet aircraft and providing together with the gas turbine 10,000–30,000 kg of thrust each. These fans are very light weight and quiet. Generally a total of 8–14 fan units, having diameters of 1.5–4 m would be required to produce the thrust required to lift a 15 to 30 ton aircraft.

Figure 13C:
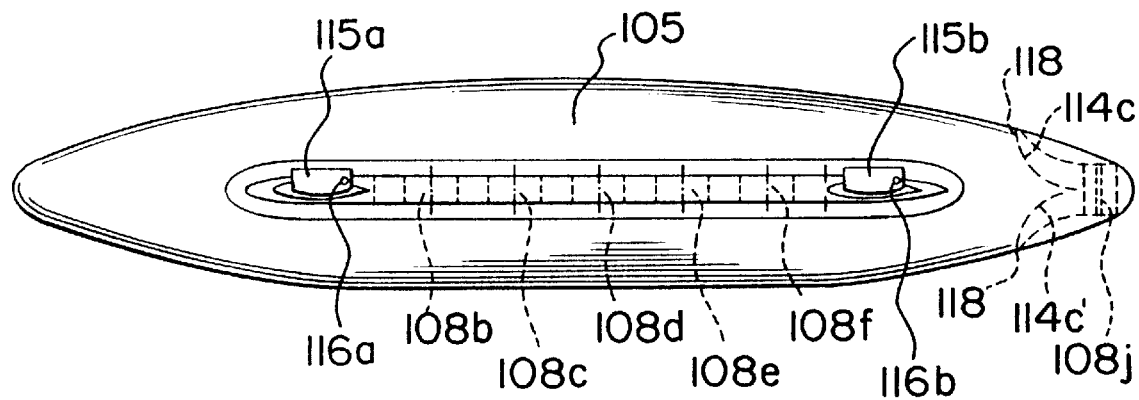
Figure 13D:
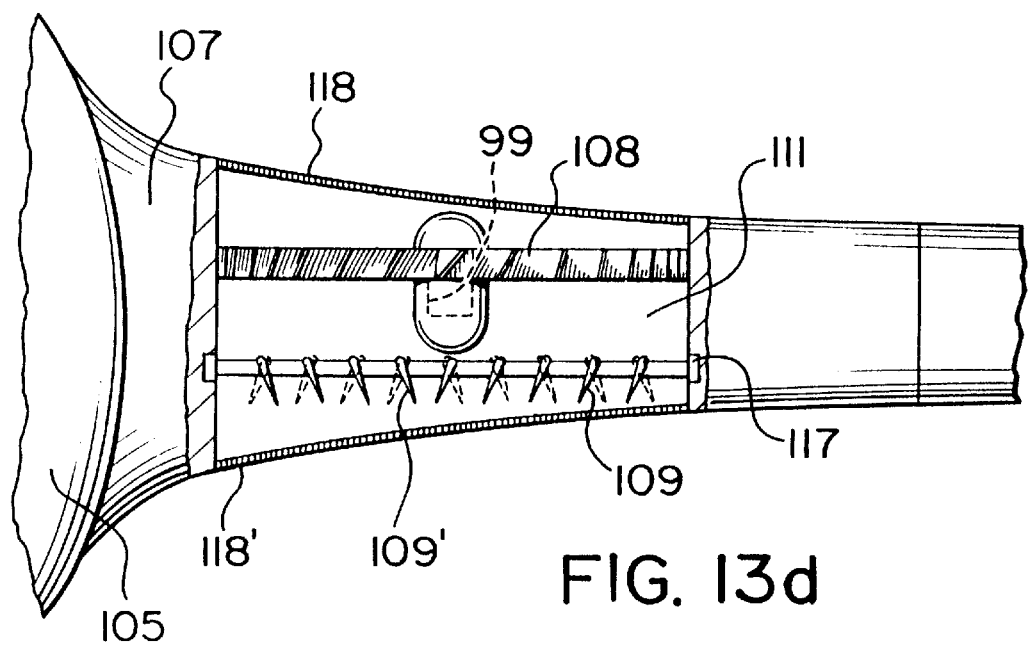

Referring to FIG. 13d, ducts 111 are formed in the mounting flanges 107, 107' for accommodating the fans. The ducts are spaced so that there is a distance of about 2 m between fan locations to allow unhindered air supply to each fan. In the ducts, below the fan disk 108 an individual high speed brushless permanent high density magnet motor drive unit 99 can be mounted and directly shafted to the fan. The motor drive units 99 preferably have 800–2,500 kW output capacity. Electric power to drive each of the fans 108a–108g and 108a'–108g", is supplied by a central power stations 113 in the rear of the aircraft. A turbo electric drive system (TEDS), as previously described in detail with reference to FIG. 11, can provide the power required.

Thrust deflectors 109 are installed in the ducts 11 below the fans. Thrust deflectors 109 can actively be controlled to deflect the thrust up to 25° to the left right sides, seen from vertical thrust axis. To allow the creation of thrust deflection creating yaw moment independently from creating translational movement fore and aft, preferably the thrust deflectors for the four fans closest to each of the bow and stem 108a, 108b, 108a', 108b', 108f, 108g, 108f', 108g' have their pivot axis parallel to the z-axis of the hull 105 and the deflectors for the remaining fans have their pivot axis parallel to the x-axis.

Preferably, the thrust deflectors for the centrally located fans 108d, 108d' are mounted beneath the fans in circular frames 117 supported by roller bearings. The circular frames 117 to which thrust deflectors 109 are mounted, has the appropriate mechanical means to allow quick rotation around its axis thus to facilitate rapid change of direction of thrust about at least 1800 with rotation rate of typically of 90°–120° per second.

The upper and lower openings of the duct 111 into which each fan installed, can be closed by a set of louvers 118, 118' to provide a fairing when the VTOL thrusters are not in usage, typically in cruise flight.

Power stations 113, based on high speed alternator 119 technology, produce electric power required to run the electric fan motors 99. High speed brushless alternators 119 are directly shafted to large scale gas turbines 120 which typically generate 5,000–10,000 kW output power. An electronic current output conditioner is controlled by computers and is coupled to the flight control and guidance system of the aircraft to assure the supply of properly modulated electric power to each of the brushless motors 99.

At the center line rear section of the fuselage 105, further fans 108h, 108i, 108j (shown in phantom), of similar type to those described above, can be mounted in ducts 112a, 112b, 112c so the plane of rotation of the fan is in a vertical position. The fans are located at about 95% chord length of the lifting body hull 105. These fans 108h, 108i, 108j provide a separate forward propulsion system for the aircraft. The electric power required to drive these fans is also delivered from the same high speed alternator turbine combination housed in power stations 113.

The air intake ducts 114a, 114b, 114c for these fan units 108h, 108i, 108j are integrated into the upper and lower rear hull surfaces at about 85–90% of the chord length of the hull. The slipstreams of the fans exit through ducts 112a, 112b, 112c mounted at center of the aircrafts trailing edge. The location of air intake ducts 114a, 114b, 114c for the rear fans 108h, 108i, 108j facilitates the reduction of the boundary layer. The intake ducts could be configured on the hull surface as a boundary layer suction ring slot 118, assisting in efficient wake propulsion and boundary layer control, delivering all these features in a synergistic fashion.

Directional control is accomplished very easily and precisely with the AHA ship. Application of differential and collective thrust vectors created by the thrust deflectors of fans 108a–108g and 108a'–108g' acting in x and z-axis provides yaw moments to allow slow speed translational movement to the sides and fore and aft. Additional directional thrust in any direction from 0°–180° can be provided by fans 108d, 108d' through rotation of its of deflector. This allows fine tuning of vectors to create an overall control vector picture which allows precision control and any desired flight direction in hover and VTOL. Additionally, the rear mounted fans can also be equipped with thrust deflectors and can be used to produce directional control in forward flight and hover. This is of particular use in the presence of head winds in hover or VTOL.

The high speed fans 108a–108g and 108a'–108g' operate at very high rpm of about 6,000–10,000. The disc loading of these fans is increased by 50% over conventional prop-rotors, from about 80–90 kg/m2 to about 140–160 kg/m2, but fan downwash speeds and unit lift performance measured in kg lift per hp remain within economically feasible ranges. Thrust column density remains in a range which avoids soil erosion problems which should be considered in any craft capable of hover.

The criticality of the overall propulsion failure in hover triggered by any individual engine failure is decreased due to the higher number of overall propulsive elements available and power generation redundancy and the significantly smaller moment imbalance caused by the failure of one or two VTOL fan units. In the preferred embodiment, if one or two of the electric motors driving the fan units should fail, the remaining number of 12 fans would assure that overall thrust levels required for safe operations can be produced by the remaining units, and overall thrust available stays almost at 100%. Thrust performance can be maintained, in the event of a failure of one of the turbines, by increasing output of the remaining prime power delivering turbines. In the presented layout.

The alternate embodiment, includes cruise flight drag reduction aerodynamics by means of boundary layer control and wake propulsion. The geometry layout results in major 20–30% reduction of wake drag, particularly in an aircraft having a relatively large lifting body hull. The fact that the air breathing turbine engines are housed close to the stem and preferably within 85–95% of hull chord length, makes a relatively simple combination of a ring suction slot and air intake ducts, at about 85% of hull length, with the rear propulsion feasible.

It will be apparent that many changes may be made to the illustrative embodiments, while falling within the scope of the invention and it is intended that all such changes be covered by the claims appended hereto.

I claim:

1. An aircraft comprising: a lifting body hull, a plurality of wings spaced about the hull including a left-side forward wing, a left-side rear wing, a right-side forward wing and a right-side rear wing, each wing being shaped as an airfoil and mounted to be pivotally moveable about its neutral axis, each wing being pivotable independent of each other wing and a propelling means mounted on each wing and being pivotally moveable at least between a position in which it is disposed to provide thrust substantially vertically and a position in which it is disposed to provide forward thrust, each propelling means being pivotable independent of each other propelling means and independent of the pivotal movement of the wing to which it is attached.

2. The aircraft as defined in claim 1 wherein each propelling means is selected to be capable of providing differential thrust from each other propelling means.

3. The aircraft as defined in claim 1 wherein each propelling means includes a prop-rotor, an engine, a gear box, a lubrication system and an interface to a control system.

4. The aircraft as defined in claim 1 wherein the wings are each formed to provide aerodynamic lift in an airstream, the lift provided by the wings being up to 45% of the lift required by the aircraft during cruise flight.

5. The aircraft as defined in claim 1 wherein the wings are located in the slipstream of the propelling means and are capable of pivoting at a faster rate than the propelling means.

6. An aircraft capable of vertical take off and landing comprising: a hull having an upper surface, a lower surface, a center point and a vertical axis passing through the center point, and a plurality of propelling means mounted about the hull in spaced apart relation about the center point, the propelling means each being capable of providing thrust substantially parallel with the vertical axis and of creating a slip stream directed substantially downwardly, the propelling means each having at least one prop-rotor assembly which, when disposed to provide thrust substantially parallel with the vertical axis, define a plane of rotation which is positioned above the hull's horizontal center line, and the lower surface being substantially flat to trap any slip stream which is deflected beneath the hull and the propelling means being spaced from the hull such that their slip streams do not impinge on the upper surface of the hull.

7. The aircraft as defined in claim 6 wherein the hull is a lifting body shaped to provide substantial aerodynamic lift in an air stream having an aspect ratio of between about 1 to 2.5 and a chord-length to chord-thickness ratio of between 1:3.5 to 1:5.

8. The aircraft as defined in claim 6 wherein the camber over the upper surface is greater than that over the lower surface.

9. The aircraft as defined in claim 6, further comprising four outriggers mounted to and extending outwardly from the hull, each outrigger having mounted thereon a wing section, each wing section being pivotally moveable about its neutral axis and being formed to provide aerodynamic lift in an airstream, the lift provided by the wings being up to 45% of the lift required by the aircraft during cruise flight.

10. The aircraft as defined in any of claims 1 or 9 wherein each wing is pivotable and positionable within the range of $-10°$ to $130°$ where an axis parallel to the hull's horizontal center line is taken as $0°$.

11. The aircraft as defined in claim 9, wherein at least one propelling means is mounted on each outrigger's outer tip, the propelling means being pivotal between a position in which it is disposed to provide thrust substantially parallel with the vertical axis and a position in which it is disposed to provide forward thrust, the pivotal movement of the propelling means being independent of the pivotal movement of the wing sections.

12. The aircraft as defined in any of claims 1 or 11 wherein each propelling means is pivotable and positionable within the range of $0°$ to $110°$ an axis parallel to the hull's horizontal center line is taken as $0°$.

13. The aircraft as defined in claim 9, wherein the hull has a center point and the wing sections are disposed substantially symmetrically about the center point.

14. The aircraft as defined in claim 13, wherein the hull includes a longitudinal axis extending through its center point and the hull in plan view is substantially symmetrical about its longitudinal axis.

15. The aircraft as defined in claims 14, wherein the hull further includes a z-axis extending through the center point perpendicular to both the longitudinal axis and the vertical axis and the hull in plan view being substantially symmetrical about the z-axis.

16. The aircraft as defined in claim 14, wherein the slip streams create a downwash current of air about the hull which substantially prevents an accumulated air mass beneath the hull from escaping.

17. The aircraft as defined in claim 16, wherein the wing sections are mounted at a distance of 1.5 times the maximum hull diameter from the hull horizontal center line.

18. The aircraft of claim 6 wherein the cross section of the hull is defined by a first arc $\alpha$ extending above the hull's horizontal centre line on each side of the hull and a second arc $\beta$ extending below the hull's horizontal centre line on each side of the hull and a top arc extending between the arcs $\alpha$ and a lower arc extending between the arcs $\beta$ and wherein the arcs $\alpha$ are each between about $60°$ to $70°$ and the arcs $\beta$ are each between about $75°$ to $85°$.

19. An aircraft comprising a hull having a longitudinal axis extending from the hull's bow to the hull's stern and including a plurality of curved elongate frame members in series each positioned substantially orthogonal to the longitudinal axis and a plurality of torsion members disposed between adjacent elongate frame members in series, the elongate frame members each formed as a plurality of tubes connected at their ends in the form of a polygon, the tubes and torsion members interconnected by joint members to form a triangulated frame, each joint member being formed as a ring with a plurality of bore holes formed therethrough, each bore hole for accepting a bolt inserted from within the ring to extend out through the bore and engageable into a tapped counter hole formed in the end one of a tube or a torsion member.

20. The aircraft as defined in claim 19, wherein the covering is comprised of a plurality of panels clamped together by a plurality of longitudinal ribs interfacing to the frame.

21. The aircraft of claim 19 wherein the plurality of curved elongate frame members are arranged in series between a front hull cap and a rear hull cap.

22. The aircraft of claim 21 wherein the front hull cap and the rear hull cap are formed from a plurality of box plate elements, each box plate element having a curved outer face.

23. The aircraft of claim 19 further comprising a covering disposed outwardly of the frame and a means for attachment of the covering to the frame, the means for attachment being disposed to transfer surface tension loads from the covering to the frame.

24. The aircraft as defined in claim 23, wherein the covering includes a first sheet of flexible material, a second sheet of flexible material overlaying the first sheet of flexible material and, disposed therebetween, a stiffening material.

25. The aircraft as defined in claim 24, wherein the stiffening material is selected from the group consisting of a sheet of honeycomb material, a closed cell foam or a gas at high pressure.

26. The aircraft as defined in claim 23 wherein the means for attachment comprises a connecting strip attached to the covering at a first end and a cable at its second end, the cable being engaged by at least one latch system mounted on the elongate frame members.

27. The aircraft as defined in claim 26, wherein the at least one latch system is mounted onto a joint member.

28. The aircraft as defined in claim 26, wherein the covering is an airtight laminate and the hull is internally pressurized.

29. The aircraft as defined in claim 28, wherein the hull is internally pressurized to about 3000 Pascal and the hull is in tension.

30. The aircraft as defined in claim 19 further comprising a keel mechanically integrated to the hull and a plurality of transverse ribs extending from the keel toward the side of the hull, the ribs stiffening the lower hull and supporting an upper deck.

31. The aircraft as defined in claim 30, further comprising a plurality of tension cables extending between the elongate frame members and the keel.

32. The aircraft as defined in claim 30 further comprising a pair of carry through beam members extending along the width of the hull and integrated to the frame and keel, the carry through beam being formed to damp vibration and an outrigger attached at the ends of each carry through beam.

33. The aircraft as defined in claim 32, wherein each of the outriggers are formed for accepting the mounting of a wing thereon, the wing being formed as a stiff wing box and mounted on the outrigger to be pivotally moveable about its neutral pressure axis.

34. The aircraft of claim 32 wherein the wings are located in the slipstream of the propelling means and are capable of pivoting at a faster rate than the propelling means.

35. The aircraft of claim 34 wherein the wing and propelling means pivotal positioning is controlled by a system comprising means for variation of the propelling means blade pitch, means for rotation of the propelling means and means for rotation of the wing sections.

36. The aircraft as defined in any of claims 34 or 5, wherein the wings are capable of pivoting at a rate of up to 30 times that of the propelling means.

37. The aircraft of any of claims 1 or 36 wherein the pivotal positioning of the wings and the propelling means is controlled by a system comprising means for variation of the propelling means blade pitch, means for rotation of the propelling means and means for rotation of the wing sections.

38. The aircraft as defined in any of claims 6 or 19 wherein the propelling means are driven by a redundant turbo-electric drive system including at least one gas turbine, an alternator and a power conditioning and transmission system to deliver power generated by the gas turbine to the propelling means.

39. The aircraft of claim 38 wherein the turbines are mounted within the hull and accessible in flight.

40. An aircraft comprising: a lifting body hull shaped to provide substantial aerodynamic lift in an air stream, a plurality of wings mounted about the hull, a plurality of high speed fans disposed about the hull, a thrust deflecting means mounted in association with the fans to provide a range of directional thrust, the thrust deflecting means being louvers positioned in the slip stream of the fans and mounted in a frame supported by roller bearings to provide for in-plane rotation of the louvers for providing thrust vectoring in 360° and an integrated propulsion system including a plurality of high speed fans positioned within the stern of the aircraft and having air intake ducts in communication with the fans for active boundary layer control.

41. The aircraft of claim 40 wherein the hull is shaped to have an aspect ratio of between about 2 and 3.5.

42. The aircraft of claim 41 wherein there are two wings positioned in tandem on each side of the hull and each wing section is pivotally moveable about its neutral pressure axis.

43. The aircraft of claim 41 wherein there are four to six fans on each side of the hull and mounted in a flange extending outwardly from the hull, the fans being disposed to provide vertical thrust.

* * * * *